United States Patent [19]

Iwamoto et al.

[11] Patent Number: 5,717,501
[45] Date of Patent: Feb. 10, 1998

[54] DIGITAL IMAGE FORMING APPARATUS

[75] Inventors: Ken-ichi Iwamoto, Nara; Kiyoshi Inamoto, Sakai; Toshio Yamagishi, Nara; Syoichiro Yoshiura, Tenri, all of Japan

[73] Assignee: Sharp Kabushiki Kaisha, Osaka, Japan

[21] Appl. No.: 467,303

[22] Filed: Jun. 6, 1995

[30] Foreign Application Priority Data

Jul. 28, 1994 [JP] Japan ................. 6-177298

[51] Int. Cl.$^6$ ................................. H04N 1/32
[52] U.S. Cl. ........................... 358/468; 358/401
[58] Field of Search ................... 358/296, 302, 358/401, 404, 444, 468; 395/114, 115, 116; 355/202, 314

[56] References Cited

U.S. PATENT DOCUMENTS

| | | | |
|---|---|---|---|
| 4,672,459 | 6/1987 | Kudo | 358/257 |
| 4,935,821 | 6/1990 | Sano et al. | 358/427 |
| 5,038,218 | 8/1991 | Matsumoto | 358/296 |
| 5,113,251 | 5/1992 | Ichiyanagi et al. | 358/75 |
| 5,208,676 | 5/1993 | Inui | 358/296 |
| 5,459,579 | 10/1995 | Hu | 358/296 |
| 5,467,202 | 11/1995 | Washio | 358/448 |

FOREIGN PATENT DOCUMENTS

| | | | |
|---|---|---|---|
| 0 397 428 A2 | 11/1990 | European Pat. Off. | H04N 1/46 |
| 0-564 871 A1 | 10/1993 | European Pat. Off. | H04N 1/32 |
| 57-14878 | 1/1982 | Japan | G06K 15/00 |
| 4-365261 | 12/1992 | Japan | H04N 1/32 |
| 5-35638 | 9/1993 | Japan | H04N 1/00 |

*Primary Examiner*—Thomas D. Lee
*Assistant Examiner*—Jerome Grant, II
*Attorney, Agent, or Firm*—David G. Conlin; David D. Lowry

[57] ABSTRACT

A digital image forming apparatus includes a CCD optical unit and an information editing section. The CCD optical unit inputs image information to an image control unit (ICU) upon an instruction to start image formation input through an operation panel. The information editing section inputs the image information to the ICU upon an instruction to start image formation input by a keyboard. The ICU stores the image information input from the information editing section page by page depending on an image processing mode specified through the operation panel and the keyboard, and successively performs image processing on the stored image information page by gage. With this arrangement, various image editing functions of a digital copying machine is effectively used for image information input from the information editing section.

34 Claims, 17 Drawing Sheets

FINISHER ILLUSTRATION

DOUBLE-SIDE COPYING MODE

FIG.15

```
╔══════════════════════════════════════════════════════════╗
║  PRINT MENU                         ENTER │ CANSEL       ║
╠══════════════════════════════════════════════════════════╣

SHEET/RIBBON              ○THERMOSENSIBLE PAPAR  ●BLACK RIBBON ○COLOR RIBBON
DRAFT MODE                ●YES  ○NO
PRINTING SPEED            ○HIGH  ●LOW
NUMBER OF COPIES          [ 1 ]  (1-99)
PAGINATION                ○YES  ●NO

BLOCK TO BE PRINTED       FROM PAGE     [ 1 ]  (1-99)
                          THROUGH PAGE  [ 99 ] (1-99)

REDUCED PRINT             ●1 TIMES ○4/5 TIMES ○2/3 TIMES ○1/2 TIMES
(IN LENGTH AND WIDTH)          *REDUCED PRINT*
PRINT WITHOUT RULING LINES ○YES ●NO    B4→A4  A4→B5  :4/5 TIMES
                                       B4→B5         :2/3 TIMES
MIRROR IMAGE              ○YES ●NO     B4, B5→REFIL  :1/2 TIMES
                                       ****************************

7 8 9  BACK
                 SPACE
          4 5 6
          1 2 3  DEL
          0 -  .
```

DIGITAL IMAGE FORMING APPARATUS

FIELD OF THE INVENTION

The present invention relates to a digital image forming apparatus for converting image information input by a plurality of input means to electronic information and performing necessary electronical image processing operations on the information so as to form an image.

BACKGROUND OF THE INVENTION

A digital copying machine has been conventionally known as an apparatus for editing image information of, for example, a document into a desired form by electronically reading a document image, electronically processing the document image as digital image information, and by reproducing the processed image on recording paper.

Similarly to an analog copying machine, post-processing devices such as stapling, sorting and double-side copying devices are connectable to the digital copying machine. These devices allow the digital copying machine to perform operations on recording paper upon which an image after being electronically processed is recorded, thereby achieving a value-added image forming system.

Moreover, the digital copying machine has a function of receiving image information from external devices connected to the copying machine and forming the image information on recording paper by an image forming section of the digital copying machine. The external devices are, for example, word processors, electronic typewriters, and personal computers. Image information produced by these devices are respectively converted into bit information, and transferred to an external data input section of the digital copying machine. This is used as a general laser printer and an optical line printer by utilizing a section of the digital copying machine.

Such a digital copying machine is disclosed, for example, in Japanese Publication for Examined Utility Model Application No. 35638/1993 (Jitsukohei 5-35638). The disclosed digital copying machine has a copying function and a printer function. The copying function allows reading of an image of a document which is set on a document platen of the copying machine upon a request for copying, and recording and reproduction of the document image by an image recording section of the copying machine. The printer function performs recording and reproduction of predetermined image data using the image recording section according to a print request from an external device connected to the copying machine.

In this digital copying machine, if a copying request is given, a printing operation responding to a print request is prohibited. When a predetermined time elapses after the completion of the copying operation upon the copying request, the printing operation responding to the print request is allowed.

Meanwhile, Japanese Publication for Unexamined Patent Application No. 14878/1982 (Tokukaisho 57-14878) discloses an office automation system including an image forming apparatus which stores character data from an external device and image data from an image reading device, and outputs images solely or by compositing (editing) these data according to need.

In the apparatus of Japanese Publication for Examined Utility Model Application No. 35638/1993 (Jitsukohei 5-35638), however, when using the printing function, only the function of the printer, which receives bit information transferred as image information from an external device and records it on recording paper in the image recording section of the digital copying machine, is performed. Therefore, various high-level image editing functions peculiar to the digital copying machine cannot be effectively used. As a result, images recorded on recording paper are not expressive.

On the other hand, in the apparatus of Japanese Publication for Unexamined Patent Application No. 14878/1982 (Tokukaisho 57-14878), after storing character data from an external device and image data from the image reading device, composition (editing) operations are performed. However, the memory capacity of a storage section for storing image data is equivalent to images contained in one sheet of a document. It is thus impossible to read a plurality of documents at a time. Therefore, various unique image editing functions of the digital copying machine, designed for processing images of a plurality of documents, cannot be effectively used. As a result, images recorded on recording paper are not expressive.

In addition, when forming the image corresponding to character data sent from an external device, this apparatus merely print the image. Namely, in this apparatus, image processing cannot be performed using editing functions of the apparatus. Accordingly, the editing functions cannot be effectively used.

SUMMARY OF THE INVENTION

An object of the present invention is to provide a digital image forming apparatus capable of performing various editing operations on image data from an external device without newly adding expensive structures.

In order to achieve the above object, a first digital image forming apparatus of the present invention includes:

image forming means for forming an image corresponding to given image information on a recording material;

start instructing means for instructing starting of an operation of the image forming means;

first input means for selecting a processing condition from a first condition group including a plurality of processing conditions and for inputting the processing condition and image information;

second input means for selecting a processing condition from a second condition group including a plurality of processing conditions, and for inputting the processing condition and image information, the second condition group being different from the first condition group;

image processing means including a memory section for storing at least two pages of image information, wherein when an instruction to start image formation is input by the start instructing means, the image processing means sequentially stores the image information from the second input means page by page in the memory section, and performs image processing on image information readout from the memory section page by page depending at least on the processing condition input from the first input means or second input means; and controlling means for controlling the operation of the image forming means for converting the image information processed by the image processing means to an image.

In this digital image forming apparatus, when an instruction to start an image forming operation is given by the start instruction means, the image information input by the second input means is stored page by page in the memory section. In the image processing means, an image processing operation depending on the set processing condition is performed on the image information readout from the memory section. The processing condition used this time is any of a processing condition from the first input means, a processing condition from the second input means or processing conditions from the first and second input means, it is thus possible to perform various image processing operations.

Moreover, since the image processing means includes the memory section capable of storing at least two pages of image information, the volume of image processing is increased. It is therefore possible to perform various processing on image information.

In order to achieve the object, a second digital image forming apparatus of the present invention includes:

image forming means for forming an image corresponding to given image information on a recording material;

first information input means for selecting a processing condition from a first condition group including a plurality of processing conditions, and for inputting the processing condition and an instruction to start an operation of the image forming means;

first image input means for inputting image information upon the input of the instruction from the first information input means;

second information input means for selecting a processing condition from a second condition group including a plurality of processing conditions, and for inputting the processing condition and an instruction to start the operation of the image forming means, the second condition group being different from the first condition group;

second image input means for inputting image information upon the input of the instruction from the second information input means;

image processing means including a memory section for storing at least two pages of image information, wherein when an instruction to start image formation is input by the second information input means, the image processing means sequentially stores the image information input from the second image input means page by page in the memory section, and performs image processing on image information readout from the memory section page by page depending at least on the processing condition input from the first information input means or the second information input means; and controlling means for controlling the operation of the image forming means for converting the image information processed by the image processing means to an image.

In this digital image forming apparatus, when an instruction to start an image forming operation is input by the first information input means, the image information input by the second information input means is stored page by page in the memory section. In the image processing means, an image processing operation depending on the set processing condition is performed on the image information which is readout from the memory section. The processing condition used this time is any of a processing condition from the first information input means, a processing condition from the second information input means or processing conditions from the first and second information input means, it is thus possible to perform various image processing operations. In addition, since the image formation operation is started upon an instruction from the second information input means, inputting of image and inputting of a start instruction are operated by the second information input means, thereby easing the operation.

Moreover, since the image processing means includes the memory section capable of storing at least two pages of image information, the volume of image processing is increased. It is therefore possible to perform various processing on image information.

The image processing means of the first and second digital image forming apparatuses preferably includes an image editing section for editing the input image information depending on a specified processing condition.

With this arrangement, it is possible to fully utilize the editing functions of the image editing section and to perform various processing on the image information.

The image processing means of the first and second digital image forming apparatuses preferably cancels a processing condition which has been set immediately after a completion of image formation by the image forming means with respect to all the image information from the second input means (the second image input means).

In this arrangement, since the processing condition specified for processing the image information from the second input means (second image input means) is cancelled immediately after the completion of image formation, an operator is not required to operate for the cancellation. This arrangement also prevents other operators from using the processing condition by mistake after the completion of the image formation. Therefore, even though the digital image forming apparatus has various functions, operating the apparatus does not required complicated processes, thereby achieving improved handling.

The image processing means of the first and second digital image forming apparatuses preferably includes selecting means for selecting that whether or not the image processing means performs image processing on image information from the second input means (the second image input means) depending on a processing condition from the first input means (the first information input means) when an instruction to start image formation is given by the start instructing means.

With this arrangement, since whether the image processing means performs image processing on the image information from the second input means (the second image input means) depending on the first condition group or not is selected, the processing condition is freely set for image information. It is thus possible to perform a desired image processing operation among various image processing operations depending on the processing condition from the first input means (the first information input means) on the image information from the second input means (the second image input means), and to record and reproduce expressive images. It is also possible to perform image processing on the image information from the second input means (the second image input means) depending on the processing condition from the second input means (the second information input means), and record and reproduce the processed image information as it is.

Consequently, the image is freely edited in a manner desired by the operator.

The image processing means of the first and second digital image forming apparatuses preferably includes priority setting means for selecting which image information takes precedence for processing between image information from the first input means (the first image input means) and image information from the second input means (the second image input means).

With this arrangement, since image information taking precedence is selected, the image information is processed in a manner desired by the operator.

The first input means of the first digital image forming apparatus preferably includes a scanner having a photoelectric converting element for optically reading a document image information and converting it to electric signals. Additionally, the second input means of the first digital image forming apparatus is preferably formed by a data editing device for editing numerical data, character data and document data.

This arrangement enables a device (for example, a digital copying machine) having the scanner connected to the image forming means to edit image information supplied from the data editing device using various editing functions of the digital copying machine. It is therefore possible to expand the functions of an external data editing device, for example, a word processor. It is thus possible to effectively utilize the various image editing functions of the digital copying machine, and to record and reproduce expressive image information.

Furthermore, since the first image input means of the second digital image forming apparatus includes a scanner having a photoelectric converting element for optically reading a document image information and converting it to electric signals and if the second image input means thereof is formed by a data editing device for editing numerical data, character data and document data, it is possible to record and reproduce expressive image information like the above-mentioned arrangement.

For a fuller understanding of the nature and advantages of the invention, reference should be made to the ensuing detailed description taken in conjunction with the accompanying drawings.

BRIEF DESCRIPTION OF THE DRAWINGS

FIG. 15 is an explanatory view showing a printing condition setting screen displayed in a display section of a word processor included in the digital image forming apparatus of FIG. 2.

DESCRIPTION OF THE PREFERRED EMBODIMENTS

The following description discusses one embodiment of the present invention with reference to FIGS. 1 to 18.

Figure 2:
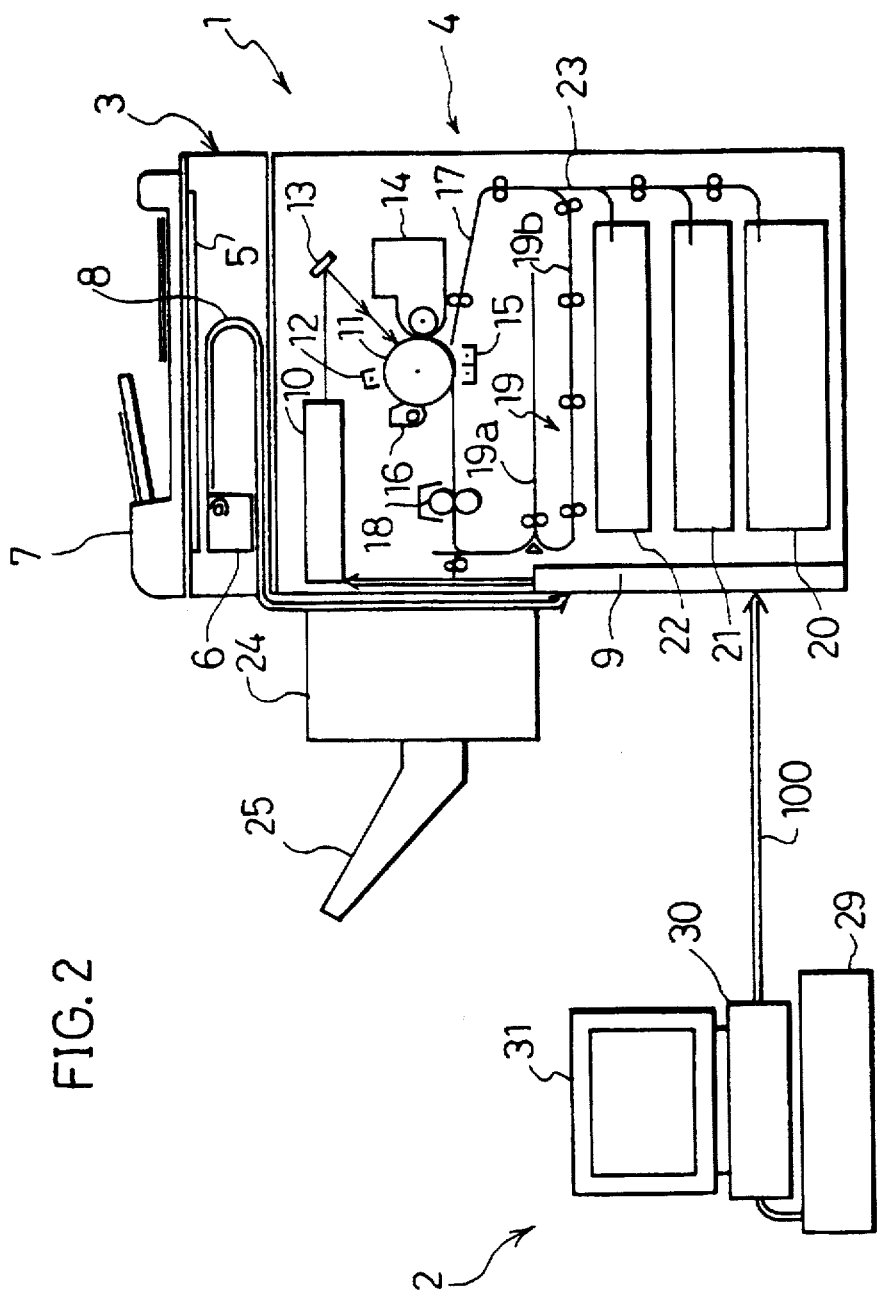
FIG. 2 is a view schematically showing the structure of the digital image forming apparatus.

As illustrated in FIG. 2, a digital image forming apparatus according to this embodiment is formed by a digital copying machine 1, and a word processor 2 as a data editing device.

The digital copying machine 1 includes a document scanning section 3 for scanning a document, and an image forming section 4 as image forming means for forming images on the basis of image information from the document scanning section 3 or the word processor 2.

The document scanning section 3 includes a document platen 5 on which a document is to be set, a CCD (charge coupled device) optical unit 6 as first image input means, and a recirculating automatic document feeding device (RADF) 7. For example, the document platen 5 is made of transparent glass. The CCD optical unit 6 is disposed below the document platen 5, and scans a document from a lower side of the document platen 5. The RADF 7 is located above the document platen 5, transports documents, and automatically sets the documents in sequence on a predetermined position of the document platen 5.

More specifically, in the document scanning section 3, when documents are sequentially set on the document platen 5 by the RADF 7, the lower side thereof is successively scanned in the main scanning direction and in the sub-scanning direction by the CCD optical unit 6 including a photoelectric converting element. As a result, the image information on the document is converted to image data. The image data is then temporarily converted to optical information by the CCD optical unit 6, and transferred to an image processing section (ICU abbreviated for image control unit) 9 as image processing means in the image forming section 4 through an optical fiber cable 8.

When transferring the image data produced in the CCD optical unit 6 to the ICU 9, the optical fiber cable 8 is used to prevent external noise and prevent the influence of, for example, noise caused by a motor driving source in a main body, on the image data. Consequently, a lowering of the image quality is prevented when reproducing the transferred image data.

The image forming section 4 includes an ICU 9, a laser unit (LSU) 10, and a photoreceptor 11. The ICU 9 performs a desired editing operation on the image data transferred from the document scanning section 3. The laser unit 10 irradiates laser light according to the image data edited by the ICU 9. The photoreceptor 11 forms an electrostatic latent image on a surface thereof with the light from the laser unit 10.

A charger 12, a reflecting mirror 13, a developing device 14, a transfer and separating unit 15, and a cleaning unit 16 are disposed in this order around the periphery of the photoreceptor 11. The charger 12 uniformly charges the surface of the photoreceptor 11. The reflecting mirror 13 reflects the laser light irradiated by the laser unit 10 toward a predetermined position of the photoreceptor 11. The developing device 14 develops an electrostatic latent image formed on the photoreceptor 11 into a visible image. The transfer and separating unit 15 transfers the visible image formed on the photoreceptor 11 to a transfer material, and separates the transfer material from the photoreceptor 11. The cleaning unit 16 removes developer remaining on the surface of the photoreceptor 11 after the transfer and separating step.

A guiding path 17 for guiding a transfer material as a recording material to the transfer and separating unit 15 is formed on the paper input side of the photoreceptor 11. A fixing unit 8 for fixing a toner image as a visible image formed on the transfer material by heat and pressure is disposed on the paper output side of the photoreceptor 11. Disposed below the fixing unit 18 is a double-side copying unit 19 including a reversing section 19a and a reversed document transporting section 19b. The reversing section 19a turns over the transfer material. The reversed document transporting section 19b transports a document from the reversing section 19a to the guiding path 17.

A first sheet tray 20, a second sheet tray 21, and a third sheet tray 22 are arranged in this order from the bottommost section of the image forming section 4. The first sheet tray 20 is capable of storing 1000 sheets of transfer material. Each of the second sheet tray 21 and third sheet tray 22 is capable of storing 500 sheets of transfer material. A transport path 23 for transporting the transfer material to the guiding path 17 is connected to the sheet trays 20 to 22. Namely, the transfer material fed out from any one of the sheet trays 20 to 22 is transported through the transport path 23 and the guiding path 17 toward the transfer and separating unit 15.

Disposed on an outer side of the fixing unit 18 of the image forming section 4 toward which the transfer material is output is a finisher 24 as a post-processing device for performing various post-processing such as stapling, punching and sorting operations on the transfer materials. The finisher 24 has an output tray 25 on which sheets of transfer material which have been post-processed by the finisher 24 are sequentially piled.

Figure 1:
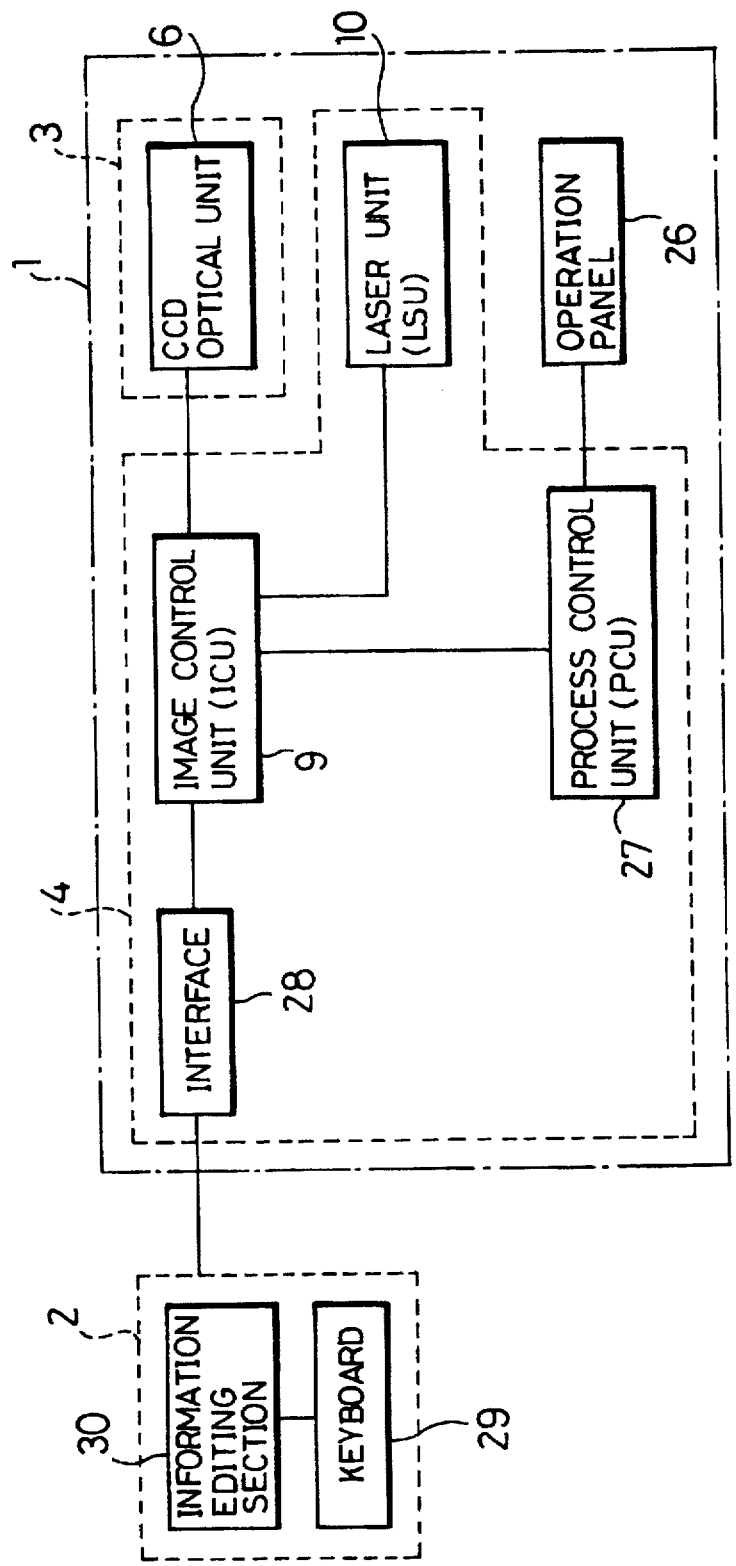
FIG. 1 is a block diagram schematically showing the structure of a digital image forming apparatus of the present invention.

As illustrated in FIG. 1, the digital copying machine 1 having the above-mentioned structure includes an operation panel 26 as first information input means. Signals entered through the operation panel 26 are transferred to the ICU 9 through a process control unit (PCU) 27. The operation panel 26 will be explained in detail later. The operation panel 26 and the CCD optical unit 6 form first input means.

The PCU 27 as controlling means controls the whole digital copying machine 1. For instance, the PCU 27 manages and controls the determination of copying modes, start and completion of scanning, start of data processing, and printing. The PCU 27 also manages and controls image data using management numbers processed by the ICU 9.

Moreover, image information from the word processor 2 as an external device located outside of the digital copying machine 1 as well as image information from the CCD optical unit 6 is transferred to the ICU 9 through an interface substrate 28. Consequently, the digital copying machine 1 having such a structure is capable of forming images corresponding to the image information from the word processor 2 in addition to image information read by the CCD optical unit 6. For example, an SCSI (small computer system interface) is used for the interface substrate 28.

As illustrated in FIG. 2, the word processor 2 includes a keyboard 29 as second information input means, an information editing section 30 as second image input means, and a display section 31 formed by, for example, a liquid crystal display for displaying image information edited by the information editing section 30.

Namely, the word processor 2 as second input means edits document information including characters and numerical information input from the keyboard 29 in the information editing section 30, and displays the edited document information on the display section 31. When a print instructing signal is input to the information editing section 30 from the keyboard 29 as start instructing means, the document information produced by the word processor 2 is transferred through a data transfer cable 100 to the ICU 9 of the digital copying machine 1. After performing predetermined post-processing operations by the ICU 9, the transferred document information is sequentially transferred to the laser unit 10, and recorded after the respective steps of the image forming section 4.

Figure 3:
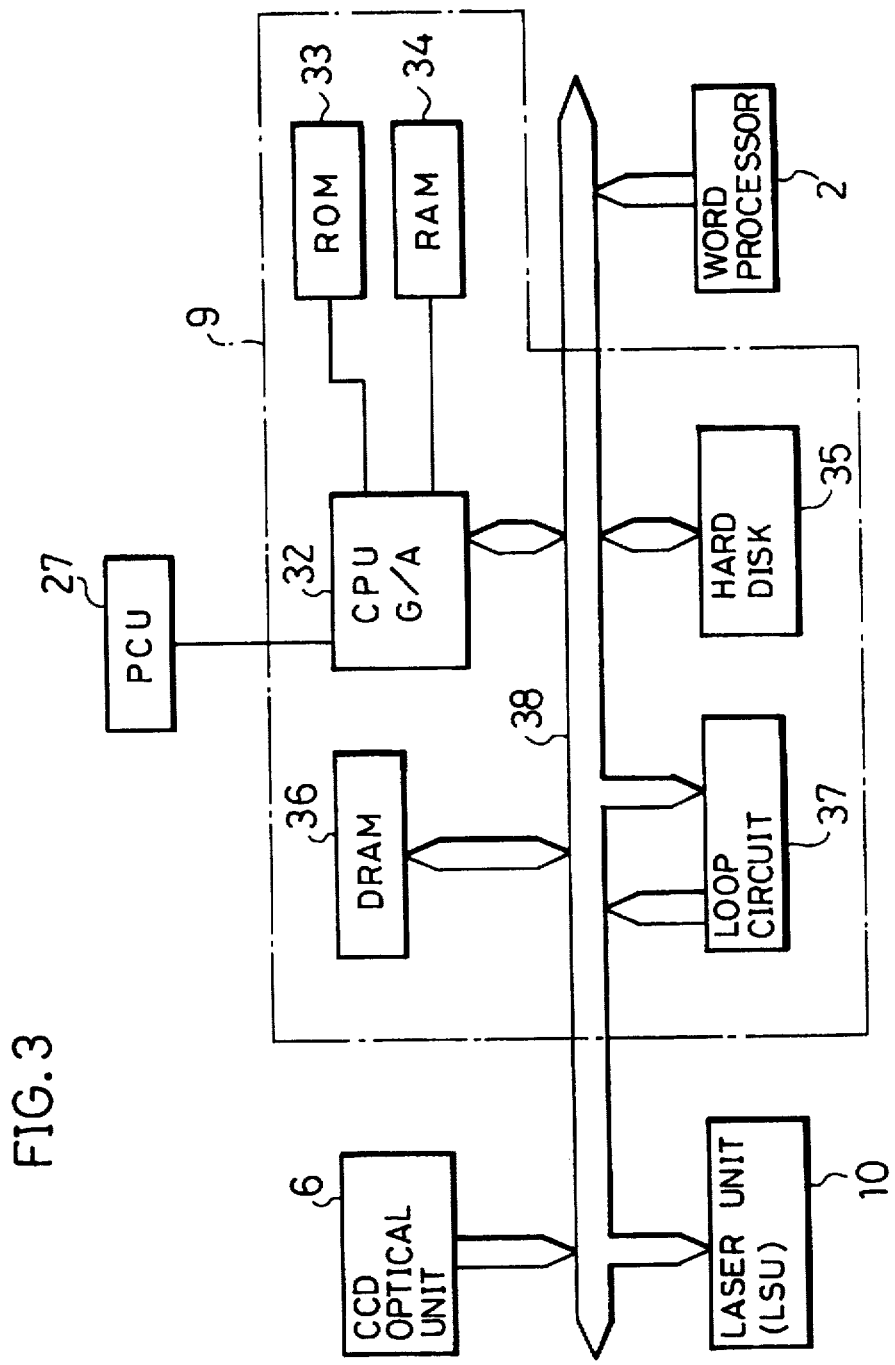
FIG. 3 is a schematic block diagram showing the structure of an image control unit incorporated into the digital image forming apparatus of FIG. 1.
Figure 4:
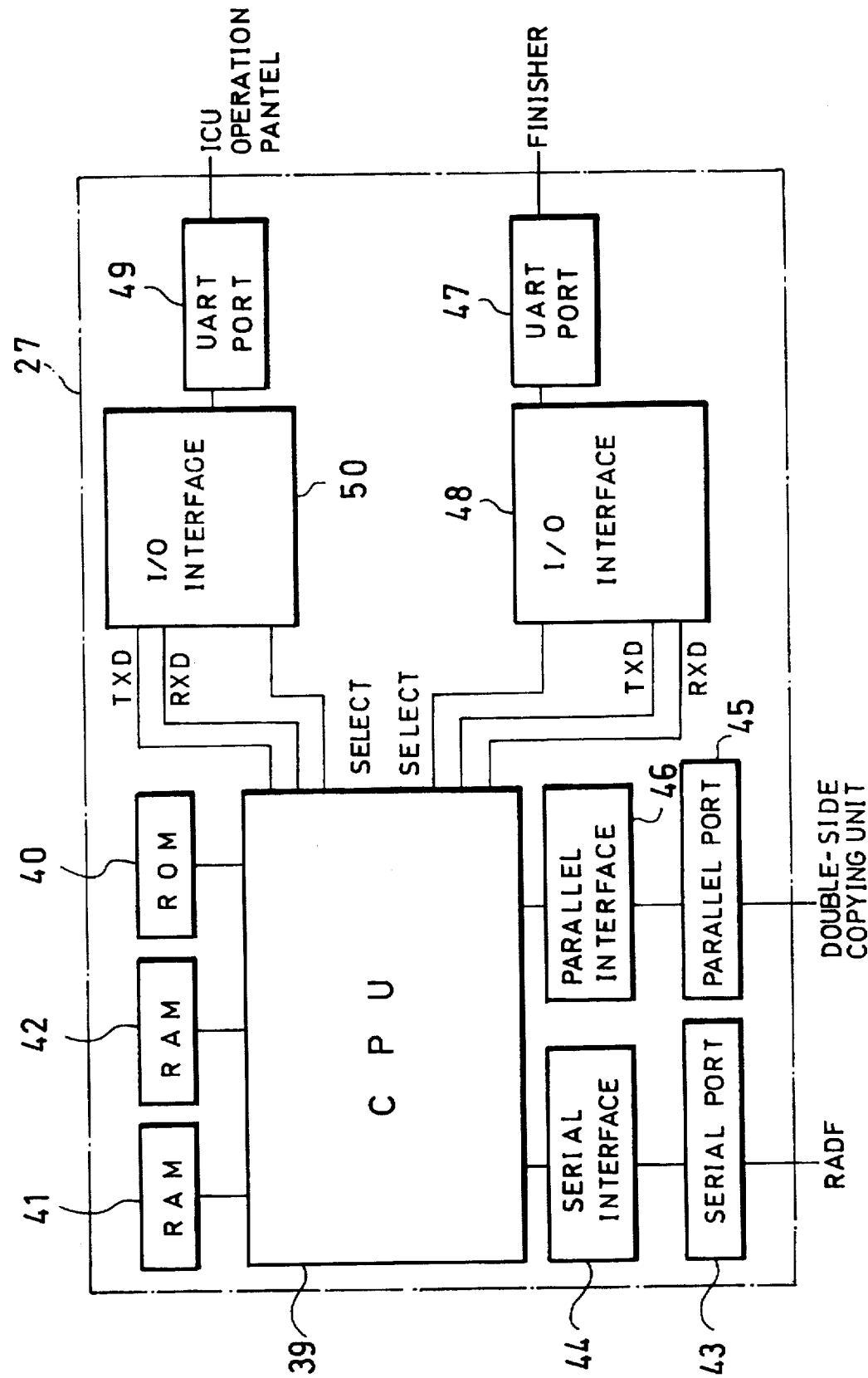
FIG. 4 is a block diagram showing a process control unit incorporated into the digital image forming apparatus of FIG. 1.

Referring now to FIGS. 3 and 4, the following description discusses the ICU 9 and the PCU 27.

First, as illustrated in FIG. 3, the ICU 9 includes a CPU 32, a ROM 33, a RAM 34, a hard disk 35, a working DRAM 36, and a loop circuit 37. The CPU 32 controls various image processing operations to be applied to image information according to a predetermined procedure. The ROM 33 stores the image processing procedure. The RAM 34 stores various control management data. The hard disk 35 functions as a large-capacity memory section for storing image information on which predetermined image processing operations have been performed. The working DRAM 36 temporarily stores image information contained in one page of a document transferred from the CCD optical unit 6 or the word processor 2. The loop circuit 37 functions as an image editing section for performing image processing operations on image information according to the processing procedure stored in the ROM 33.

In this embodiment, the hard disk 35 has a memory capacity for storing about 100 pages of A4-size single-side documents. The hard disk 35 is required to have at least a memory capacity capable of storing image information corresponding to two pages of A4-size documents.

The CPU 32, the hard disk 35, the DRAM 36 and the loop circuit 37 are connected to an image bus 38 that is also connected to the word processor 2, the CCD optical unit 6, and the laser unit 10.

More specifically, in the ICU 9, image information input from the CCD optical unit 6 is stored page by page in the DRAM 36 and transferred page by page to the loop circuit 37 according to a control signal from the PCU 27. In the loop circuit 37, image processing operations are performed on each unit of image information according to the image processing procedure stored in advance in the ROM 33. One unit of image information corresponds to one page of document. Then, the image information is sequentially stored page by page as bit information on the hard disk 35. The image information stored on the hard disk 35 is transferred page by page to the laser unit 10, and images are formed.

On the other hand, image information input from the information editing section 30 of the word processor 2 is stored page by page in the DRAM 36, and then image processing operations are performed in a similar manner to the above-mentioned procedure.

As illustrated in FIG. 4, the PCU 27 as an image formation controlling section includes a CPU 39 for controlling the respective sections of the digital copying machine 1 according to a sequence program. The CPU 39 is connected to a ROM 40, a working RAM 41, a backup RAM 42, and an interface substrate. The ROM 40 stores a sequence program for controlling and managing the entire system. The working RAM 41 and the backup RAM 42 store various control and management data. The interface substrate includes I/O ports for input and output of control signals for controlling and managing the respective units in the digital copying machine 1.

Examples of the interface substrate are a serial interface substrate 44 having a serial port 43 connected to the RADF 7, a parallel interface substrate 46 having a parallel port 45 connected to the double-side copying unit 19, an I/O interface substrate 48 having a UART (universal asynchronous receiver and transmitter) port 47 connected to the finisher 24, and an I/O interface substrate 50 having a UART port 49 connected to the ICU 9 and the operation panel 26.

In the event where the finisher 24 is controlled, the PCU 27 gives a processing mode to be operated to the CPU in the finisher 24 when starting copying/printing. Then, the CPU recognizes receipt of sheet every time a sensor installed in the finisher detects a sheet, and processes the sheet in an operation mode which is individually set for each sheet. Additionally, when the processing is in progress, the PCU 27 gives information to be used for recognizing the end of a set of documents or the start of another set of documents to the finisher 24. Stapling is performed based on the given information. When the PCU 27 informs the finisher 24 that processing is complete, the finisher 24 recognizes the end of a series of processing and returns to the standby state.

For example, when producing two copies of printed data from documents A, B, C of three pages, the finisher 24 receives sheets and information in the following order.

processing information→Sheet C1→Sheet B1→Sheet A1→End of a set of documents/Start of another set of documents→Sheet C2→Sheet B2→Sheet A2→End of processing.

When the finisher 24 receives the information "the end of a set of documents/start of another set of documents" and "the end of processing", it staples sheets which were received before receipt of the information as one set, and outputs it to the output tray 25.

Similarly to the control of the finisher 24, in the event where the RADF 7 and the double-side copying unit 19 are controlled, the PCU 27 performs processing in a mode set in advance. Usually, the RADF 7 and the double-side copying unit 19 do not include a CPU. However, if a CPU is included for control like the finisher 24, it is possible to perform controlling operations using commands between the CPU and the PCU 27.

The following description explains in detail the CCD optical unit 6, the loop circuit 37 and the laser unit 10.

Figure 5:
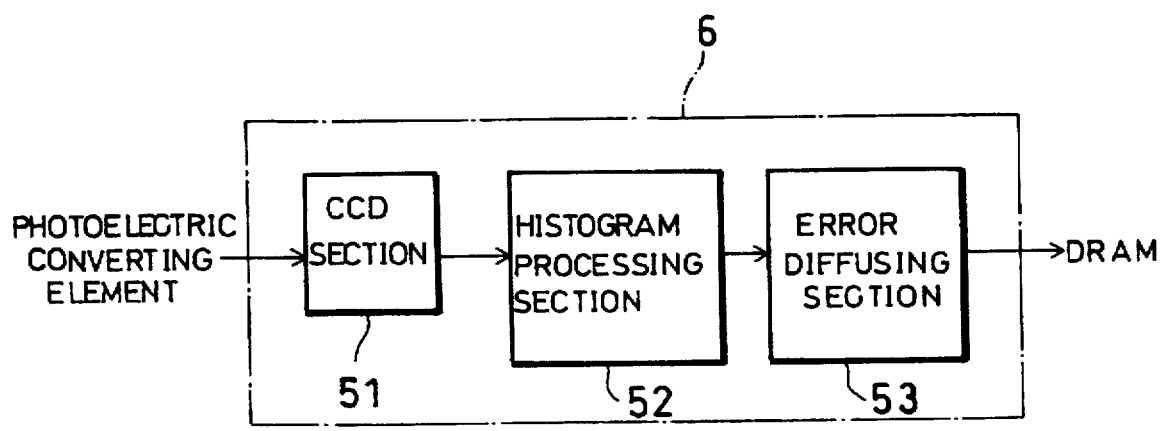
FIG. 5 is a schematic block diagram showing the structure of a CCD optical unit incorporated into the digital image forming apparatus of FIG. 1.

As illustrated in FIG. 5, the CCD optical unit 6 includes a CCD section 51, a histogram processing section 52, and an error diffusing section 53. The CCD optical unit 6 converts the image data of a document read by a photoelectric element into one-bit digital data, and processes the image data by an error diffusing method while making a histogram. The data is then temporarily stored in the DRAM 36.

More specifically, in the CCD section 51, analog electric signals representing the densities of pixels of the image data are converted into digital signals by an A/D converter. The digital signals are then corrected by the MTF correction, the black-and-white level correction, or the gamma correction. The resulting 8-bit digital signals representing 256 tones are transferred to the histogram processing section 52.

In the histogram processing section 52, the digital signals output from the CCD section 51 are added according to each of pixel densities of 256 tones to obtain density information (histogram data). The histogram data is sent as pixel data to the error diffusing section 53, if necessary.

In the error diffusing section 53, the 8-bit/pixel digital signal output from the histogram processing section 52 is converted into 1-bit digital signal by an error diffusing method, and relocation is performed for faithfully reproducing the densities of local portions of the document. The resulting 1-bit image data is stored in the DRAM 36. The error diffusing method is a type of pseudo-half-tone processing, and an error caused by the conversion to one bit is reflected in the conversion of an adjacent pixel data into one bit data.

Figure 6:
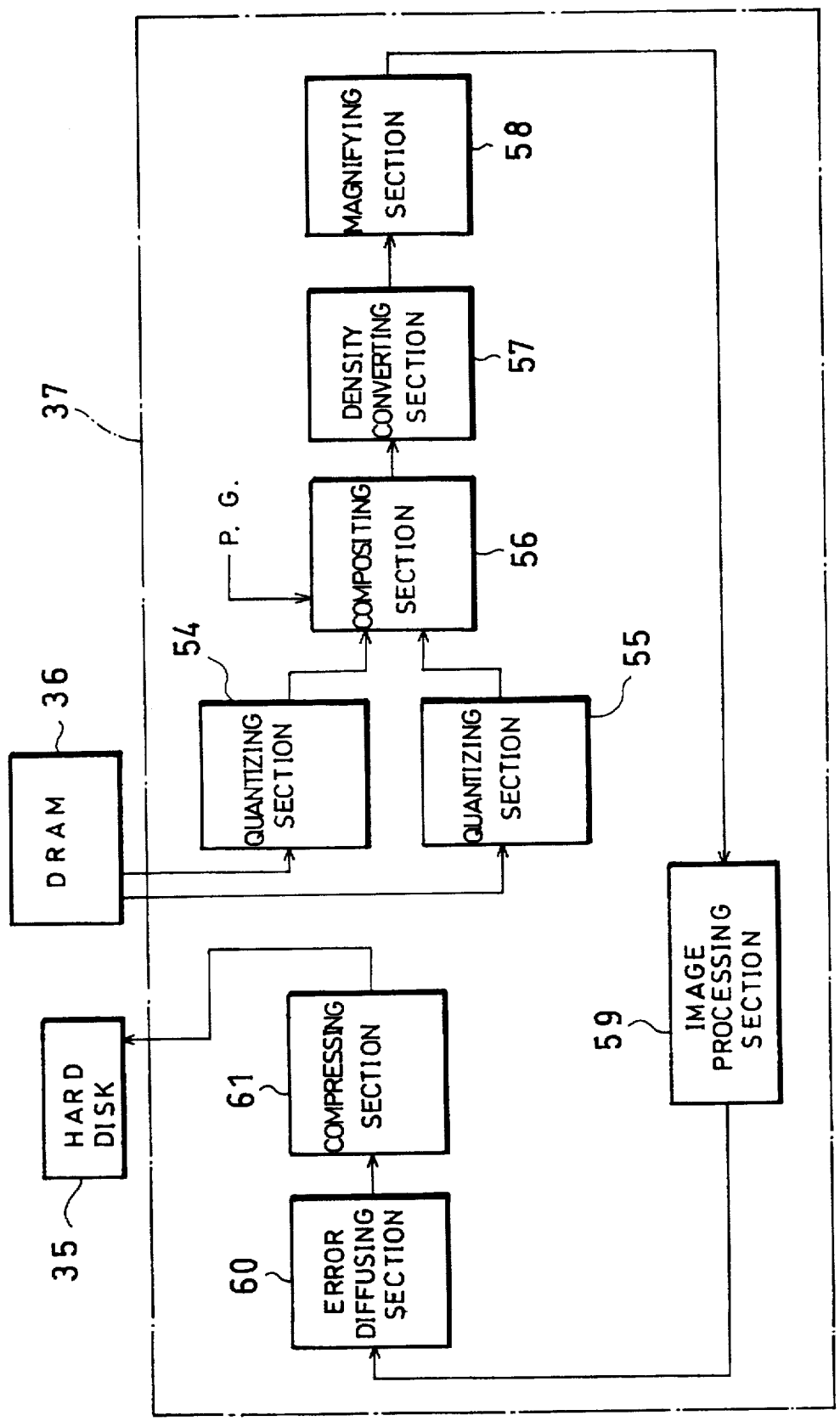
FIG. 6 is a schematic block diagram showing the structure of a loop circuit incorporated into the image control unit of FIG. 3.

As illustrated in FIG. 6, the loop circuit 37 includes quantizing sections 54 and 55, a compositing section 56, a contrast transformation section 57, a magnifying section 58, an image processing section 59, an error diffusing section 60, and a compressing section 61. The loop circuit 37 is a processing section for finally converting the input image data into image data in a form desired by an operator, and processes the image data until all the image data is converted into a desired final form and stored on the hard disk 35. The above-mentioned processing sections in the loop circuit 37 do not always perform their functions but perform their functions if need be.

The quantizing sections 54 and 55 reconvert the image data which has been converted to one-bit data by the error diffusing section 53 into data representing 256 tones.

In the compositing section 56, a logical operation, i.e., logical OR, AND, or exclusive-OR operation is selectively carried out on each pixel. The data subjected to the operation is the pixel data stored in the ROM 33 shown in FIG. 3 and one-bit data from a pattern generator (PG).

In the contrast transformation section 57, the relation between the output density and input density is determined according to a predetermined contrast transformation table with respect to the digital signals of 256 tones.

In the magnifying section 58, interpolation is performed based on the input known data according to an input magnification rate so as to obtain pixel data (a density level) of pixels to be magnified. Then, magnification processing is performed in a main scanning direction after executing magnification processing in a sub-scanning direction.

In the image processing section 59, various image processing operations are performed on the input pixel data, and the collection of information about data strings, for example, extraction of features, is performed.

The error diffusing section 60 performs a function similar to that of the error diffusing section 53 of the CCD optical unit 6.

In the compressing section 61, if the image data from the error diffusing section 60 has a final form of output image data, the data is compressed by run length encoding. The 1-bit data as the image data is output and stored in the form of the compressed data on the hard disk 35.

Figure 7:
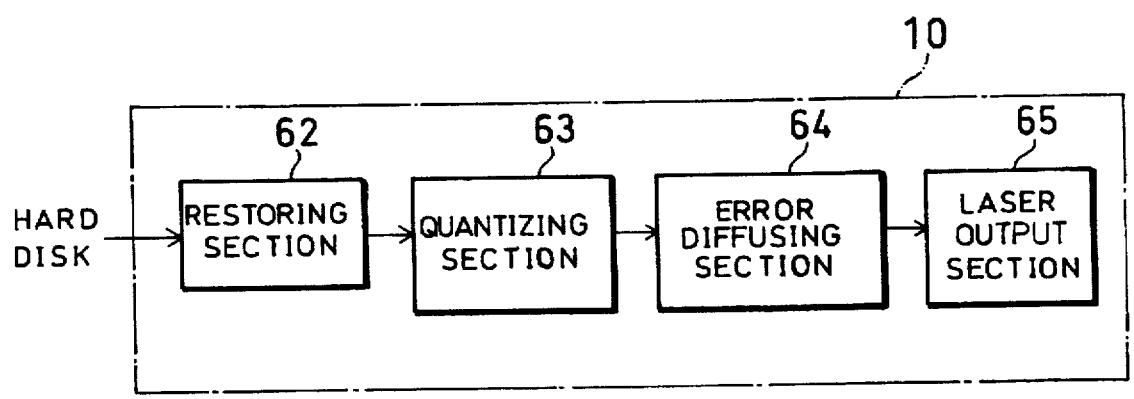
FIG. 7 is a schematic block diagram showing the structure of a laser unit incorporated into the digital image forming apparatus of FIG. 1.

As illustrated in FIG. 7, the laser unit 10 includes a restoring section 62, a quantizing section 63, an error diffusing section 64, and a laser output section 65. The laser unit 10 restores the image data which has been stored in a compressed form on the hard disk 35, reconverts the data into data representing 256 tones, converts the resulting data into data represented by two bits which gives a smoother halftone image than one-bit data by an error-diffusing operation, and transfers it to the laser output section 65.

In the restoring section 62, the compressed image data stored on the hard disk 35 is restored.

The quantizing section 63 performs processing in the same manner as in the quantizing sections 54 and 55 of the loop circuit 37 so as to reconvert the data represented by two bits by the error-diffusing operation into the data representing 256 tones.

The error diffusing section 64 executes the same processing as that performed by the error diffusing section 53 of the CCD optical unit 6.

The laser output section 65 converts the digital pixel data into an ON/OFF signal of a laser diode according to the control signal from a sequence controller, not shown. The laser light is switched between on and off by the ON/OFF signal.

Figure 8:
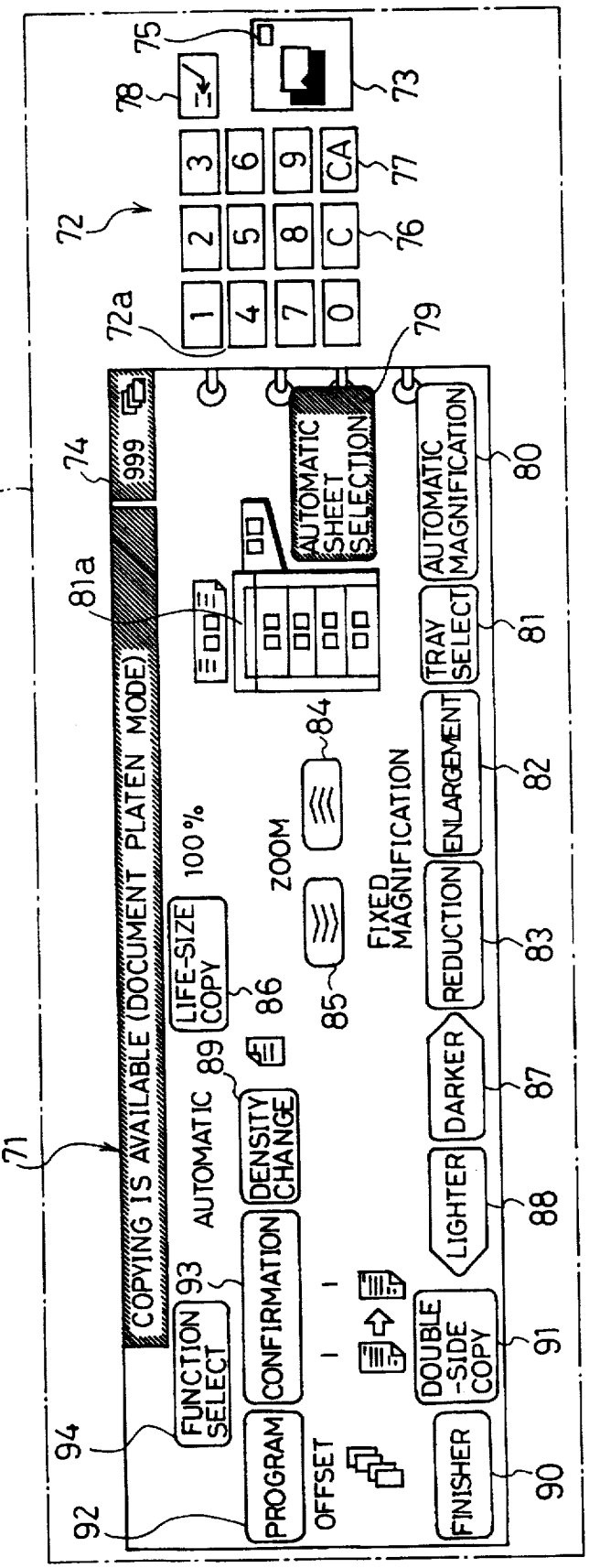
FIG. 8 is a plan view showing the structure of an operation panel incorporated into a digital copying machine of the digital image forming apparatus of FIG. 2.

As illustrated in FIG. 8, the operation panel 26 of the digital copying machine 1 of this embodiment includes a liquid crystal panel 71, a ten-key section 72 through which the number of copies to be produced is specified, and "Print" switch 73 as the start instructing means for inputting an instruction to start copying. The liquid crystal panel 71 is formed by a dot-matrix type liquid crystal display element.

Copying of a document by the digital copying machine 1 is carried out by pressing the "Print" switch 73 after specifying the number of copies to be produced through the ten-key 72. Namely, when the "Print" switch 73 is depressed, the CCD optical unit 6 is actuated to read a document, edits the image information of the read document, and then records and reproduces an image.

When performing recording and reproduction of image in the copying mode, recording and reproduction of image information transferred from the external word processor 2 is prohibited.

The liquid crystal panel 71 has a transparent touch panel on the surface thereof. When selecting functions or when performing some adjustments in the respective modes, inputs necessary for the selection or adjustment are entered by pressing a pattern displayed on the liquid crystal display section. The liquid crystal panel 71 is also provided with a copy number indicating section 74 for indicating the number of copies to be produced, specified through the ten-key 72.

The "Print" switch 73 has a indication lamp 75 on the surface thereof, for indicating an operator that inputting an instruction to start copying is available. When the indication lamp 75 is turned on, inputting an instruction to start copying is available. On the other hand, when the indication lamp 75 is turned off, inputting an instruction to start copying is unavailable.

The ten-key section 72 has a clear key 76, a clear all key 77, and an interruption key 78 as well as a ten-key 72a for setting the number of copies to be produced. The clear key 76 is used for clearing the set number of copies to be produced, and temporarily stopping a copying operation in producing a copy. The clear all key 77 resets a copying condition to a predetermined standard state. The interruption key 78 is operated when performing a copying operation under the copying condition which is different from the currently set copying condition.

The liquid crystal panel 71 is in a state shown in FIG. 8 when the digital copying machine 1 is turned on. In this state, various modes are selected and set by depressing keys on the transparent touch panel mounted on the surface of the liquid crystal panel 71.

The liquid crystal panel 71 is provided with the following known keys: "Automatic sheet selection" key 79; "Automatic magnification" key 80; "Tray select" key 81; a selected-tray indicating section 81a; "Enlargement" key 82; "Reduction" key 83; "Enlarging zoom" key 84; "Reducing zoom" key 85; "Life-size copy" key 86; "Density set" keys 87 and 88; and "Density change" key 89.

The liquid crystal panel 71 also has "Finisher" key 90, "Double-side copy" key 91, "Program" key 92, "Confirmation" key 93, "Function select" key 94. The "Finisher" key 90 is used for selecting various functions of the finisher 24 attached to the digital copying machine 1. The "Double-side copy" key 91 selects various functions of the double-side copying unit 19 in the digital copying machine 1. The "Program" key 92 is depressed to execute various programs when performing different operations on each document. The "Confirmation" key 93 is depressed when confirming the contents of the programs of the "Program" key 92. The "Function select" key 94 is used for selecting various functions of the digital copying machine 1.

Figure 9A:
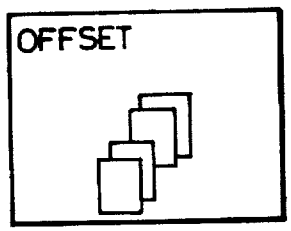
FIG. 9(a) is an explanatory view illustrating a display pattern of an offset mode as an operation mode of a finisher, displayed on a liquid crystal panel included in the operation panel of FIG. 8.
Figure 9B:
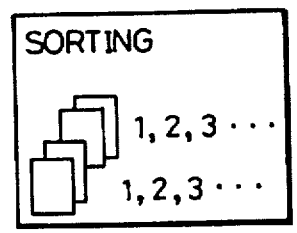
FIG. 9(b) is an explanatory view illustrating a display pattern of a sorting mode as an operation mode of the finisher, displayed on the liquid crystal panel included in the operation panel of FIG. 8.
Figure 9C:
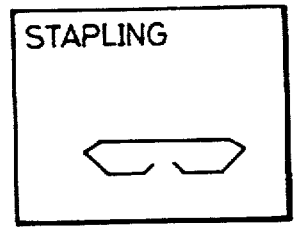
FIG. 9(c) is an explanatory view illustrating a display pattern of a stapling mode as an operation mode of the finisher, displayed on the liquid crystal panel included in the operation panel of FIG. 8.
Figure 9D:
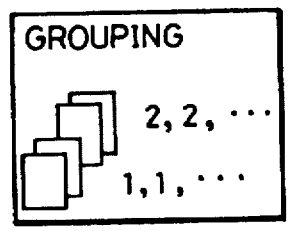
FIG. 9(d) is an explanatory view illustrating a display pattern of a grouping mode as an operation mode of the finisher, displayed on the liquid crystal panel included in the operation panel of FIG. 8.
Figure 9E:
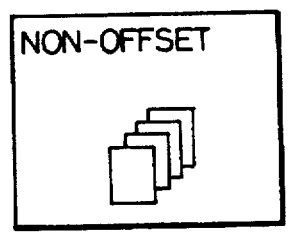
FIG. 9(e) is an explanatory view illustrating a display pattern of a non-offset mode as an operation mode of the finisher, displayed on the liquid crystal panel included in the operation panel of FIG. 8.

For example, when using the finisher 24 attached to the digital copying machine 1, the "Finisher" key 90 on the liquid crystal panel 71 is depressed. As illustrated in FIGS. 9(a) to 9(e), display patterns of the post-processing mode change every time the "Finisher" key 90 is depressed. More specifically, an offset mode shown in FIG. 9(a) is displayed in the initial state. Thereafter, the display changes to a sorting mode shown in FIG. 9(b), a stapling mode shown in FIG. 9(c), a grouping mode shown in FIG. 9(d), a non-offset mode shown in FIG. 9(e) in this order by pressing the "Finisher" key 90.

In the grouping mode, copies of a sheet of document are sorted into one group. In the non-offset mode, the post-processing functions of the finisher 24 are not used.

Figure 10A:
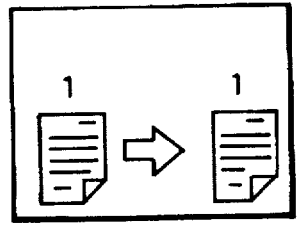
FIG. 10(a) is an explanatory view illustrating a display pattern of a single-side to single-side mode, displayed on the liquid crystal panel included in the operation panel of FIG. 8.
Figure 10B:
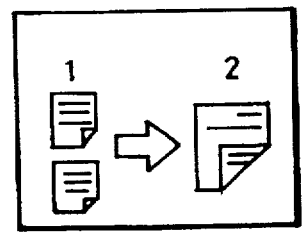
FIG. 10(b) is an explanatory view illustrating a display pattern of a single-side to double-side mode as a double-side mode, displayed on the liquid crystal panel included in the operation panel of FIG. 8.
Figure 10C:
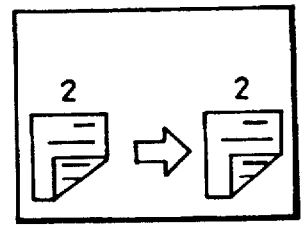
FIG. 10(c) is an explanatory view illustrating a display pattern of a double-side to double-side mode as a double-side mode, displayed on the liquid crystal panel included in the operation panel of FIG. 8.
Figure 10D:
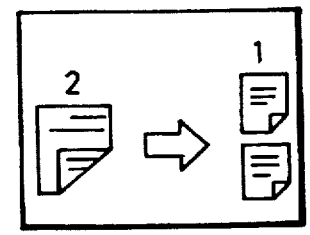
FIG. 10(d) is an explanatory view illustrating a display pattern of a double-side to single-side mode as a double-side mode, displayed on the liquid crystal panel included in the operation panel of FIG. 8.

When the "Double-side copy" key 91 on the liquid crystal panel 71 is depressed, as illustrated in FIGS. 10(a) to 10(d), the display patterns of the double-side copying modes change. More specifically, a single-side to single-side mode for copying a single-side document to one side of a sheet shown in FIG. 10(a) is displayed in the initial state. Thereafter, the display changes to a single-side to double-side mode shown in FIG. 10(b) for copying single-side documents on each side of a sheet, a double-side to double-side mode shown in FIG. 10(c) for copying a double-side document to both sides of a sheet, and a double-side to single-side mode shown in FIG. 10(d) for copying a double-side document to one of the sides of each of two sheets in this order by pressing the "Double-side copy" key 91.

In the digital copying machine 1 of this embodiment, when the "Print" switch 73 on the operation panel 26 is depressed, the image information of a document read by the CCD optical unit 6 is edited, recorded and reproduced in a mode specified through the liquid crystal panel 71.

The digital copying machine 1 of this embodiment has a plurality of functions. Selecting a function from these functions is performed by depressing the "Function select" key 94 on the liquid crystal panel 71 for switching the displayed screen on the liquid crystal panel 71 on the operation panel 26 to a menu screen (1) shown in FIG. 11 and by operating with the menu screen (1).

Figure 11:
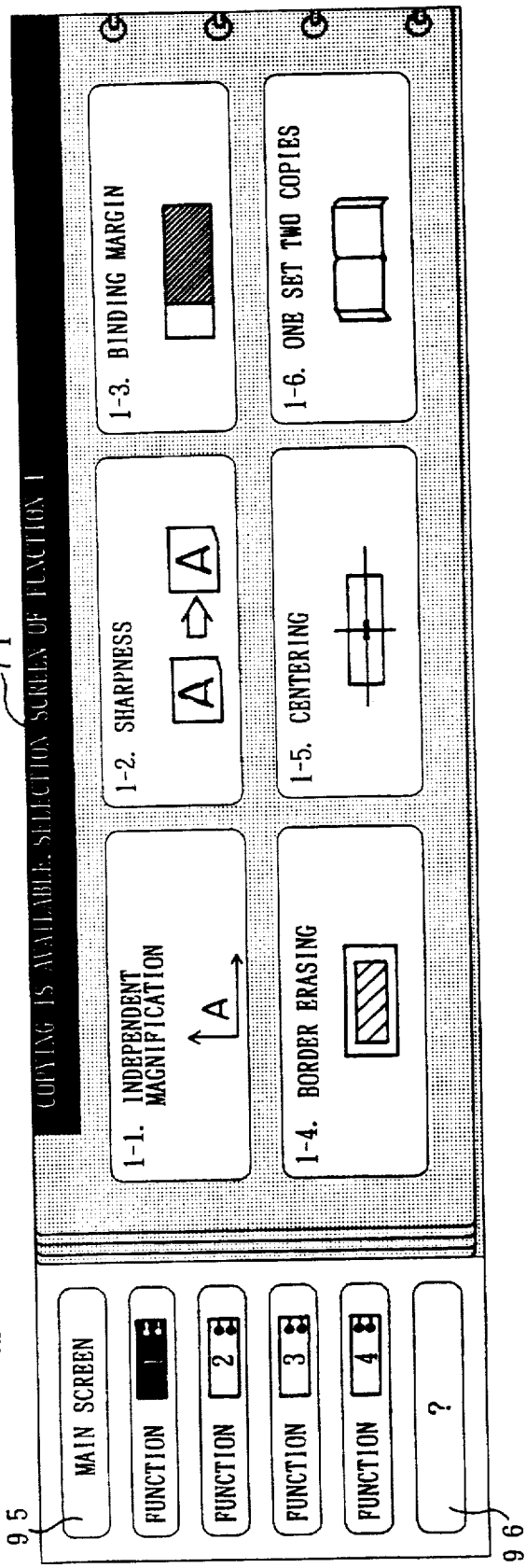
FIG. 11 is an explanatory view showing a menu screen (1) displayed on the liquid crystal panel included in the operation panel of FIG. 8.

As illustrated in FIG. 11, the menu screen (1) has "Main screen" key 95, a "Function 1" key, "Function 2" key, a "Function 3" key, a "Function 4" key, and an "Option" key 96 on the left side thereof. The "Main screen" key 95 returns the liquid crystal panel 71 to a main screen shown in FIG. 8. The "Function 1" to "Function 4" keys are used for selecting Functions 1 to 4, respectively. The "Option" key 96 is used to select an optional function if added. The function keys are illuminated when selected.

Figure 12:
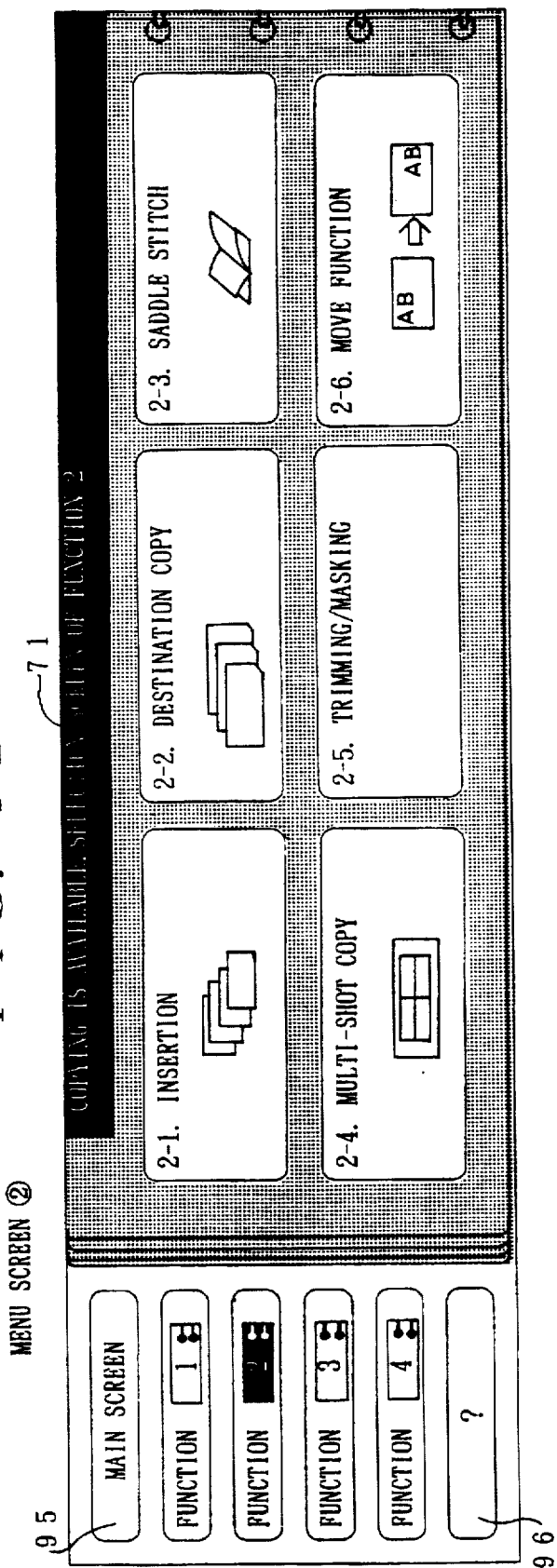
FIG. 12 is an explanatory view showing a menu screen (2) displayed on the liquid crystal panel included in the operation panel of FIG. 8.

Specifically, when the "Function 2" key on the menu screen (1) shown in FIG. 11 is depressed, the liquid crystal panel 71 is switched to a menu screen (2) shown in FIG. 12. When the "Function 3" key is depressed, the screen is switched to a menu screen (3) shown in FIG. 13. When the "Function 4" key is depressed, the screen is switched to a menu screen (4) shown in FIG. 14. The operator can select a plurality of functions from one menu screen. It is also possible to select a plurality of functions from different menu screens.

However, when the "Function select" key 94 is depressed at the time the initial screen of the liquid crystal panel 71 shown in FIG. 8 is displayed, the screen of the "Function 1", i.e., the menu screen (1) shown in FIG. 11 is displayed.

As illustrated in FIGS. 11 to 14, on the menu screens displayed on the liquid crystal panel 71 by depressing the respective function keys, function selecting keys for selecting a function from available functions shown in the main menu are displayed.

As illustrated in FIG. 11, in the menu screen (1), a function selecting key (1-1) is "Independent magnification" key, a function selecting key (1-2) is "Sharpness" key, a function selecting key (1-3) is "Binding margin" key, a function selecting key (1-4) is "Border erasing" key, a function selecting key (1-5) is "Centering" key, and a function selecting key (1-6) is "One set two copies" key. By depressing these function selecting keys, the corresponding functions are performed.

The above-mentioned functions are explained in detail below. "Independent magnification" is a function of separately setting magnification rates in a vertical direction and a horizontal direction. With the independent magnification function, it is possible to set the magnifying scale so that, for example, a reproduced image is magnified by 90% in the vertical direction and 140% in the horizontal direction.

"Sharpness" is a function of reducing moire caused, for example, by noise in the input of CCD. "Binding margin" is a function of creating a binding margin in a copy.

"Border erasing" is a function of erasing a border appearing in black when producing a copy from a book. "Centering" is a function of positioning a shifted center of a copy to the exact center position.

"One set two copies" is a function of copying facing pages of a book.

Next, in the menu screen (2), as illustrated in FIG. 12, a function selecting key (2-1) is "Insertion" key, a function selecting key (2-2) is "Destination copy" key, a function selecting key (2-3) is "Saddle stitch" key, a function selecting key (2-4) is "Multi-shot Copy" key, a function selecting key (2-5) is "Trimming/Masking" key, and a function selecting key (2-6) is "Move function" key. By depressing these function selecting keys, the corresponding functions are performed.

The above-mentioned functions are explained in detail below. "Insertion" is a function of inserting a separate sheet or a color sheet in a document.

"Destination copy" key is a function of including a destination in a copy. For example, it is possible to read a A4-size sheet on which 10 destinations are recorded, independently extract a destination, and include it in a copy.

"Saddle stitch" is a function of creating a binding margin for saddle stitch in the center of a copy. "Multi-shot copy" is a function of producing a compressed and reduced copy. With this function, for example, if there are four A4-size documents, it is possible to copy all the four documents in one A4-size sheet.

"Trimming" is a function of producing a copy of only extracted parts by placing a white sheet over a document. "Masking" is a function of producing a copy by eliminating a specified part of a document.

Finally, "Move function" produces a copy by moving a desired part of a document to another location.

Figure 13:
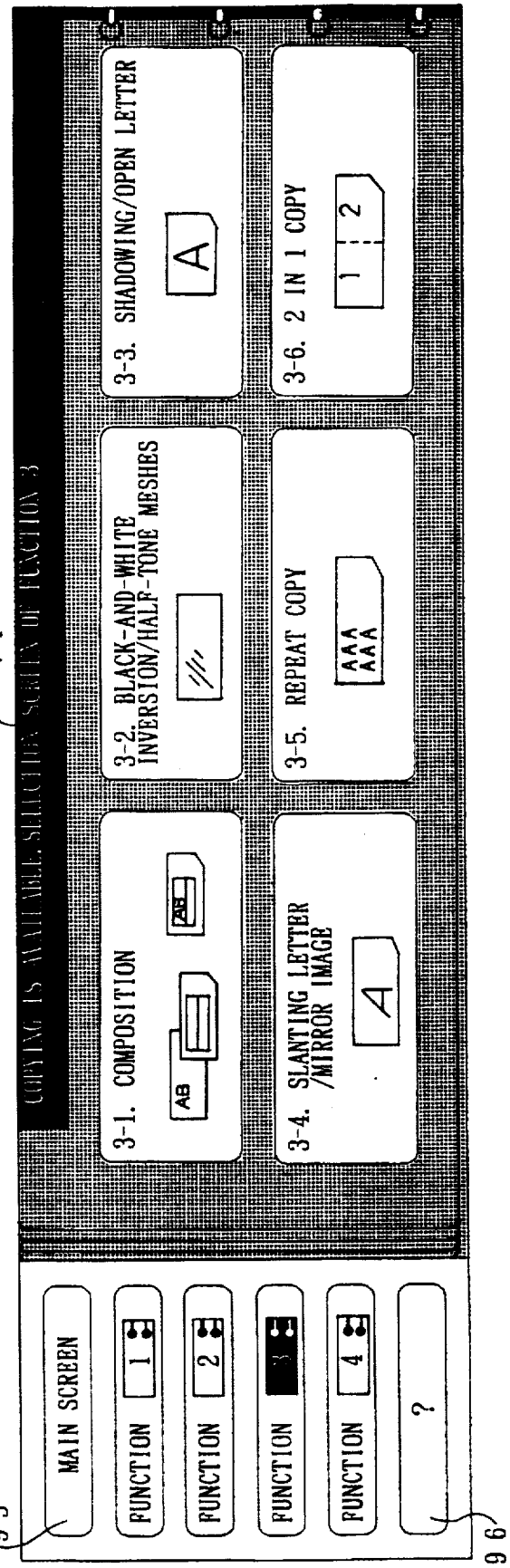
FIG. 13 is an explanatory view showing a menu screen (3) displayed on the liquid crystal panel included in the operation panel of FIG. 8.

In the menu screen (3), as illustrated in FIG. 13, a function selecting key (3-1) is "Composition" key, a function selecting key (3-2) is "Black-and-white inversion/Half-tone meshes" key, a function selecting key (3-3) is "Shadowing/Open letter" key, a function selecting key (3-4) is "Slanting letter/Mirror image" key, a function selecting key (3-5) is "Repeat copy" key, and a function selecting key (3-6) is "2 in 1 copy" key. By depressing these function selecting keys, the corresponding functions are performed.

The above-mentioned functions are explained in detail below. "Composition" is a function of producing a composite copy from a plurality of documents.

"Black-and-white inversion" is a function of copying a document image by inverting the negative and positive relation of the document image. "Half-tone meshes" is a function of producing a copy by adding vertical strips and horizontal strips on a document.

"Shadowing" is a function of producing a three-dimensional looking copy. "Open letter" is a function of printing only outlines of a document image.

"Slanting letter" is a function of printing letters in a document as slanting letters when producing a copy. "Mirror Image" is a function of printing a mirror image of a document image when producing a copy.

"Repeat copy" is a function of repeatedly producing copies of the same document image.

Finally, "2 in 1 copy" is a function of copying two documents in a sheet of paper. For instance, two A4-size documents are copied on one A3-size sheet by dual page printing.

Figure 14:
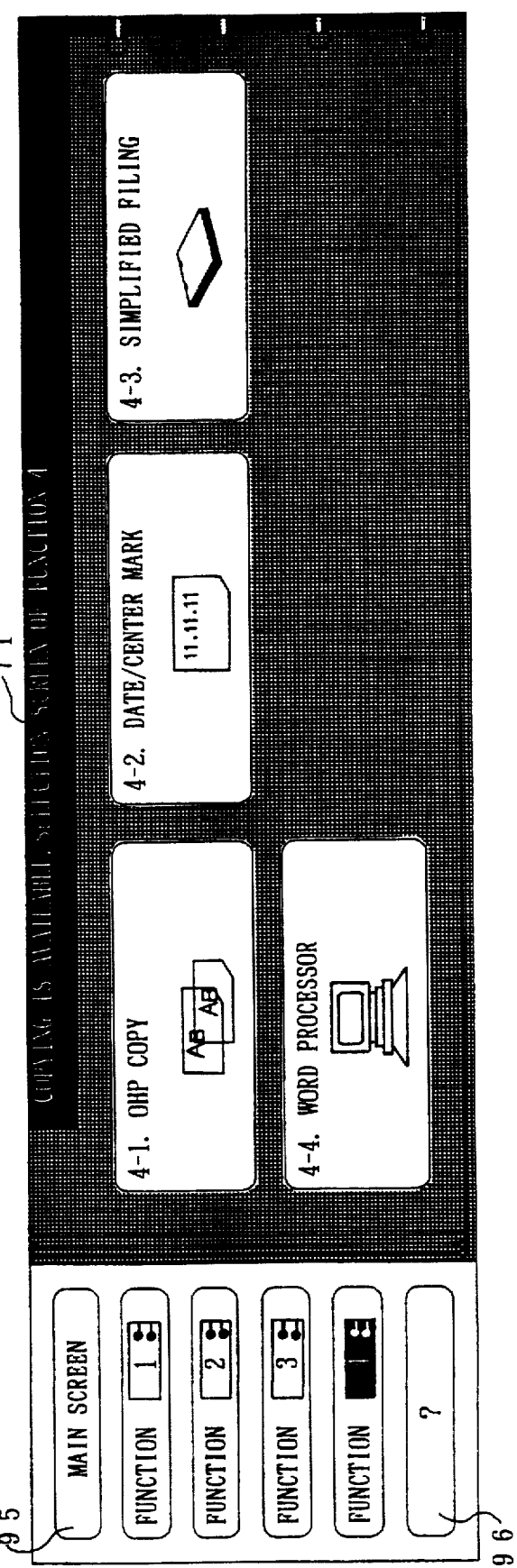
FIG. 14 is an explanatory view showing a menu screen (4) displayed on the liquid crystal panel included in the operation panel of FIG. 8.

In the menu screen (4), as illustrated in FIG. 14, a function selecting key (4-1) is "OHP copy" key, a function selecting key (4-2) is "Date/Center mark" key, a function selecting key (4-3) is "Simplified filing" key, and a function selecting key (4-4) is "Word processor" key. By depressing these function selecting keys, the corresponding functions are performed.

The above-mentioned functions are explained in detail below. First, "OHP copy" is a function of copying a document on a transparent sheet.

"Date" is a function of printing a date when producing a copy of a document. "Center mark" is a function of printing a center mark when producing a copy, the center mark indicating the center for a punching operation.

"Simplified filing" is a function for filing data which is stored on a hard disk in the digital copying machine 1.

Finally, "Word processor" is an example of external devices for producing image information, connected to the digital copying machine 1 through a data transfer cable 100. When the "Word processor" key is depressed, the digital copying machine 1 enters into a state in which inputting image information from the external device is available.

More specifically, when the "Word processor" key (4-4) is depressed after displaying the menu screen (4) shown in FIG. 14 by operating the operation panel 26 of the digital copying machine 1, a transfer mode for processing image information transferred from an external device is set.

As described above, in the digital copying machine 1 of this embodiment, if the "Function select" key 94 is depressed when the operation panel 26 displays the initial screen, the menu screen (1) shown in FIG. 11 is displayed in the liquid crystal panel 71. Then, an operator looks forward the "Word processor" key (4-4) for selecting a transfer mode by sequentially displaying the menu screens (2), (3) and (4) in the liquid crystal panel 71 by successively depressing the "Function 2" key, "Function 3" key and "Function 4" key on the menu screen (1). The digital copying machine 1 is set in the transfer mode and brought into a standby state for receiving image information from the word processor 2 as an external device by depressing the "Word processor" key (4-4).

At this time, when the processing functions peculiar to the digital copying machine 1 are selected through the operation panel 26 of the digital copying machine 1, i.e., when functions of the menu screens (1) to (4) are selected, a desired image processing operations are performed on the image information sent from the word processor 2 as the external device. If a function for editing images is not selected from any of the menu screens, the image information transferred from the word processor 2 is recorded and reproduced as it is.

Additionally, if the operator learns the digital copying machine 1 to a degree, it is possible to directly depress the "Function 4" key to display the menu screen (4) shown in FIG. 14, and depress the "Word processor" key (4-4).

Therefore, with the structure of the copying machine, it is possible to select the transfer mode (printer mode) and a usual copying mode. In the transfer mode, an image forming operation is performed on the image information transferred from the word processor 2 as the external device. In the copying mode, an image forming operation is performed on the image information of a document from the document scanning section 3. The transfer mode includes a normal transfer mode (hereinafter just referred to as the normal mode) and an extended transfer mode (hereinafter referred to as the extension mode). In the normal mode, the image information transferred from the word processor 2 is output as it is, and image formation is performed. In the extension mode, image processing operations are performed on the image information transferred from the word processor 2 using the functions of the copying machine, the resulting image information is output, and an image forming operation is performed.

With the structure of the digital copying machine 1, one of two transfer modes is selected through the operation panel 26 of the digital copying machine 1. More specifically, the menu screen (4) shown in FIG. 14 is displayed on the operation panel 26, and the extension mode or the normal mode is selected depending on whether or not another function is selected from the screens of the liquid crystal panel 71 shown in FIGS. 8 and 11 to 14 within a predetermined time period after depressing the "Word processor" key (4-4) for receiving image information from an external device.

In the word processor 2, when "Print" key on the keyboard 29 is depressed, as illustrated in FIG. 15, the printing condition setting screen is displayed on the display section 31 of the word processor 2. In the printing condition setting screen, it is possible to specify known functions, such as "Sheet/ribbon", "Save ribbon", "Print speed", "Number of copies", "Pagination", "Block", "Reduced print", "Print without ruling lines", and "Mirror image", listed in this order from the top of the screen. In the printing condition setting screen shown in FIG. 15, black circles indicate the selected functions. A change is made by moving a cursor on the screen. In FIG. 15, the cursor is positioned on "Black ribbon" in the item "Sheet/ribbon".

Therefore, when the normal mode is selected through the operation panel 26 of the digital copying machine 1, image data, which is obtained after the image processing operations corresponding to the processing functions specified on the printing condition setting screen of the word processor 2, is transferred to the digital copying machine 1.

Figure 16:
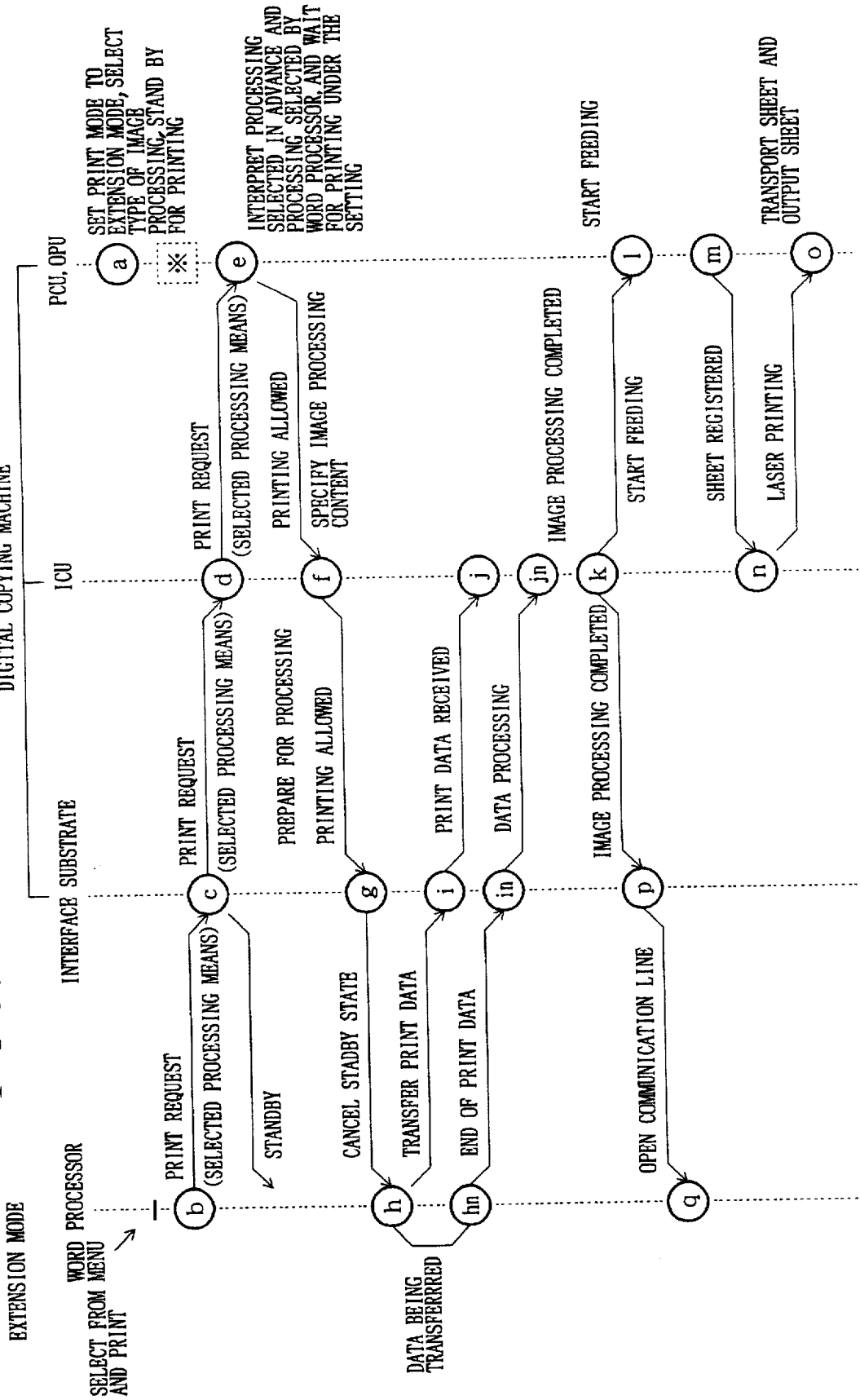
FIG. 16 is a state chart showing changes in the state of image processing in an extension mode as one of transfer modes of the digital image forming apparatus of FIG. 1.
Figure 17:
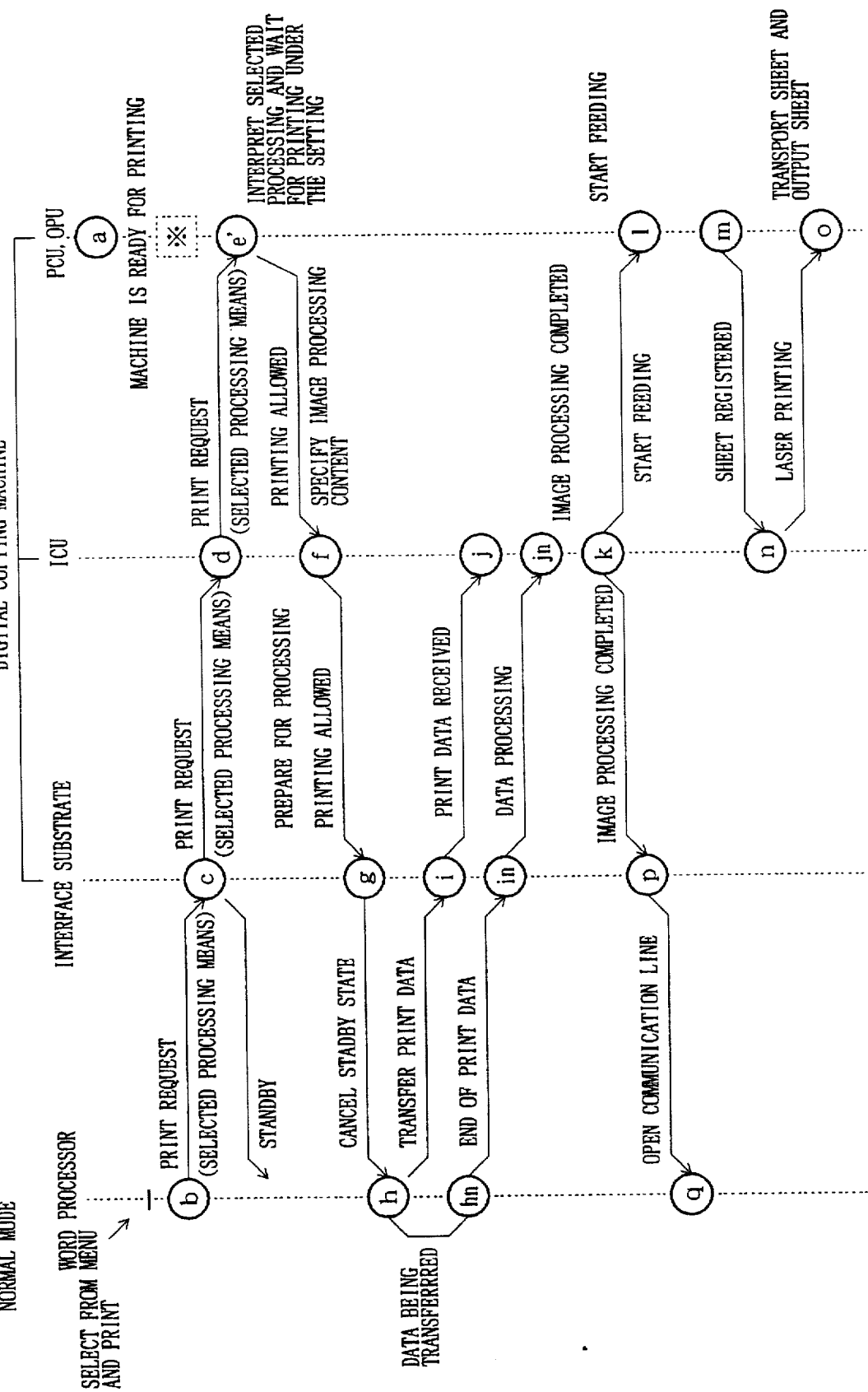
FIG. 17 is a state chart showing changes in the state of image processing in a normal mode as one of the transfer modes of the digital image forming apparatus of FIG. 1.
Figure 18:
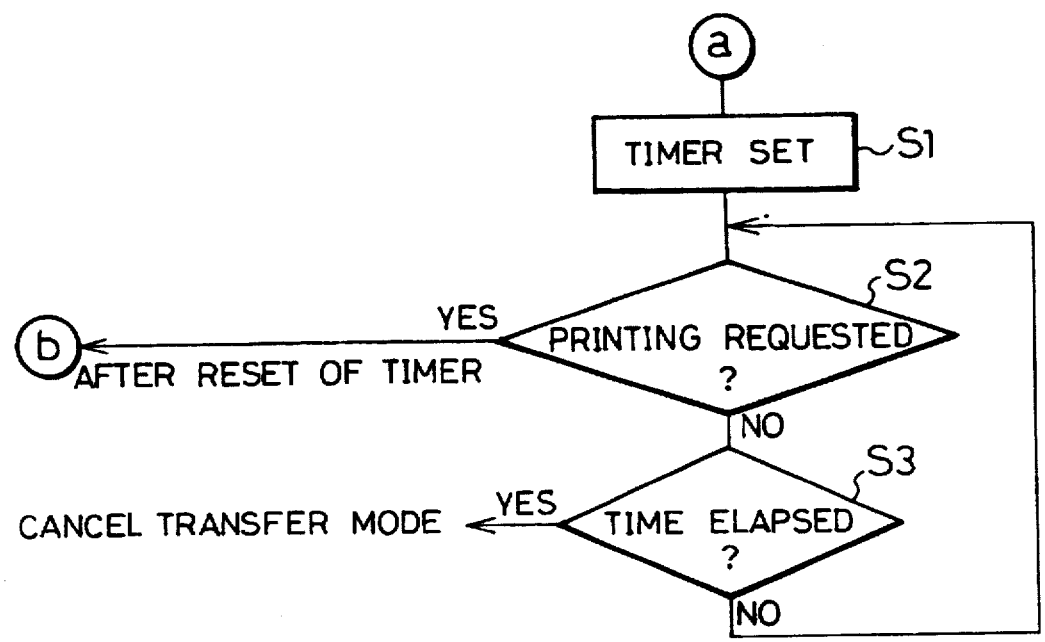
FIG. 18 is a flow chart showing the control procedure when cancelling of a transfer mode is effected using a timer in the digital image forming apparatus of FIG. 1.

Referring now to the state charts of FIGS. 16 and 17 and the flow chart of FIG. 18, the procedure for processing image information in each transfer mode is explained. In each mode, control operations are carried out by the word processor 2 and the interface substrate 28, the ICU 9, the operation panel 26 and the PCU 27 of the digital copying machine 1.

First, the extension mode will be explained with reference to the state chart of FIG. 16. Selectable processing functions in the extension mode are basically all of the processing functions peculiar to the digital copying machine 1 (a first condition group) and the processing functions of the word processor 2 (a second condition group).

First, before starting printing by operating the keyboard 29 connected to the information editing section 30 of the word processor 2, the operator leaves from the word processor 2, moves to the digital copying machine 1, selects from the operation panel 26 of the digital copying machine 1 the "Word processor" key (4-4) that is a function key for receiving the image information from an external device, and selects a desired processing function to be applied to the image information produced by the word processor 2.

Namely, the operation panel 26 is operated so that the PCU 27 gives an instruction to bring the ICU 9 into a standby state for receiving image information. Consequently, the digital copying machine 1 stands by for receiving the image information from the word processor 2 (stage a).

At this time, the indication lamp 75 installed in the "Print" switch 73 on the operation panel 26 is turned off, and the liquid crystal panel 71 displays "Stand by for copying". At this time, input of image information from the document scanning section 3 of the digital copying machine 1 is prohibited. Moreover, image-processing content information is specified through the operation panel 26.

Then, the operator selects desired functions from the respective menu screens. When the operator gives an instruction to start printing through the word processor 2 by operating the keyboard 29 of the word processor 2, a printing request signal and processing information with respect to image information selected through the word processor 2 are output from the word processor 2 through the data transfer cable 100 to the interface substrate 28 of the digital copying machine 1 (stage b).

The processing information selected through the word processor 2 is, for example, information about the sheet size, character size specified in a printing condition setting screen displayed in the display section 31 of the word processor 2 when instructing printing of the produced document data, and a size of document specified when creating a document.

The printing request signal and processing information input through the interface substrate 28 are temporarily transferred to the ICU 9. When a printing request is input from the word processor 2 to the interface substrate 28, a standby signal is temporarily output to the word processor 2 (stage c).

The printing request signal and the processing information are transferred from the ICU 9 to the PCU 27 and the operation panel 26 (OPU in FIG. 16). The ICU 9 interprets the processing information specified through the word processor 2, and uses it for successive processing (stage d).

The operation panel 26 displays, for example, size information in a predetermined area on the liquid crystal panel 71 on the operation panel 26 according to the information about the document size based on the processing information specified through the word processor 2. The PCU 27 selects a sheet tray storing a suitable transfer material from the first sheet tray 20 to the third sheet tray 22 in the digital copying machine 1 according to the information about the sheet size, and indicates the selected sheet tray in the selected-tray indicating section 81a.

When the digital copying machine 1 is judged to be in a standby state ready for recording and reproducing of image information under conditions specified by the above-mentioned procedure, the PCU 27 outputs to the ICU 9 a printing enable signal indicating that printing is available and also transfers the image-processing content information specified by the digital copying machine 1 at stage "a" to the ICU 9 (stage e).

When the ICU 9 receives the image-processing content information from the digital copying machine 1, it prepares for the image processing operation and outputs a standby state canceling signal to the word processor 2 through the interface substrate 28 (stages f and g).

Then, the word processor 2 transfers the produced image data as print data (stage h).

The print data is sequentially transferred to the ICU 9 through the interface substrate 28. After a predetermined image processing operation is performed page by page, the data is stored page by page on the hard disk 35 in the ICU 9 (stage j).

The word processor 2 transfers the final image data and termination data for terminating the transfer of the print data (stage hn).

The termination data is then transferred to the ICU 9 through the interface substrate 28 (stage jn).

When the image processing is complete, the ICU 9 outputs to the PCU 27 a feeding start signal for starting feeding of sheets as recording material necessary for recording and reproduction of image (stage k). Then, the PCU 27 outputs a signal for performing preliminary feeding of sheet from a sheet tray selected beforehand so as to prepare the sheet necessary for recording of image in the digital copying machine 1 (stage 1).

When the sheet fed by preliminary feeding reaches a predetermined position of the digital copying machine 1, a signal indicating the registration of the sheet is transferred to the ICU 9 from the PCU 27 which controls the operations of the digital copying machine 1 (stage m).

The ICU 9 sequentially transfers image information on which the image processing operations have been performed to the laser unit 10. Then, the laser unit 10 sequentially emits laser light to the photoreceptor 11 of the digital copying machine 1 according to the image information transferred from the ICU 9 (stage n).

At this time, if the operator has set a desired number of copies to be produced through the ten-key section 72 on the operation panel 26, the set number of sheets are successively transported in sequence from the sheet tray. In addition, the processed image information is repeatedly read out from the hard disk 35 under the control of the ICU 9. Then, the sheets on which recording has been performed, i.e., images have been formed, are sequentially output to the finisher 24 (stage o).

On the other hand, when the image processing is complete at stage "k", the ICU 9 outputs an image end signal to the interface substrate 28 so as to allow the reception of image information which is different from a sequence of the previously transferred image information (stage p).

The interface substrate 28 opens a communication line to the word processor 2 upon the image end signal (stage q).

As described above, when a sequence of the recording and reproduction of image information is complete, the extension mode, i.e., the printer mode of the "Word processor" key (4-4), that is a function key for receiving image information from an external device, is temporarily cleared. As a result, the digital copying machine 1 enters into a standby state in the copying mode.

Returning to the standby state in the copying mode from the extension mode takes place immediately after the completion of a sequence of recording and reproducing operations in the extension mode.

Moreover, in the above-mentioned controlling procedure in the extension mode, although the print data is transferred from the word processor 2 after selecting a processing function by the digital copying machine 1, this is not limited. For example, after the digital copying machine 1 temporarily stores a sequence of image information transferred from the word processor 2 on the hard disk 35, an image processing operation may be performed on the image information by depressing the "Print" switch 73 of the digital copying machine 1 depending on a processing function specified through the operation panel 26 of the digital copying machine 1, and then recording and reproduction of image may be sequentially performed in the image forming section 4.

Referring now to the state chart of FIG. 17, the following description explains the normal mode. In the normal mode, the digital copying machine 1 performs only processing functions selectable by the word processor 2 (a second condition group).

The "Word processor" key (4-4) is selected. Then, desired processing functions are selected for image information produced by the word processor 2. The PCU 27 sends an instruction to the ICU 9 so that the ICU 9 stands by for receiving the image information by operating the operation panel 26. As a result, the digital copying machine 1 stands by for receiving the image information from the word processor 2 (stage a).

At this time, the indication lamp 75 of the "Print" switch 73 on the operation panel 26 is turned off so as to display "Stand by for copying" on the liquid crystal panel 71. At this time, input of image information from the document scanning section 3 of the digital copying machine 1 is prohibited. Moreover, image-processing content information is specified through the operation panel 26.

Thereafter, when the operator operates the keyboard 29 of the word processor 2 to give an instruction to start printing through the word processor 2, the printing request signal and the processing information about the image information selected through the word processor 2 are output from the word processor 2 through the data transfer cable 100 to the interface substrate 28 of the digital copying machine 1 (stage b).

The processing information selected through the word processor 2 is, for example, information about the sheet size and character size specified in a printing condition setting screen displayed in the display section 31 of the word processor 2 when instructing printing of the produced document data, and a size of document specified when producing a document.

The printing request signal and the processing information input through the interface substrate 28 are temporarily transferred to the ICU 9. Then, when the printing request is transferred to the interface substrate 28 from the word processor 2, a standby signal is temporarily output to the word processor 2 (stage c).

The printing request signal and the processing information are transferred from the ICU 9 to the PCU 27 and the operation panel 26 (OPU in FIG. 17). The ICU 9 interprets the processing information specified through the word processor 2, and uses it for successive processing (stage d).

The operation panel 26 displays, for example, size information in a predetermined area of the liquid crystal panel 71 according to the information about the document size based on the processing information specified through the word processor 2. The PCU 27 selects a sheet tray storing a suitable transfer material from the first sheet tray 20 to the third sheet tray 22 in the digital copying machine 1 according to the information about the sheet size, and indicates the selected sheet tray in the selected-tray indicating section 81a.

When the digital copying machine 1 is judged to be in the standby state ready for recording and reproducing of image information under the processing conditions specified by the word processor 2 through the above-mentioned procedure, the PCU 27 outputs a printing enable signal indicating that printing is available to the ICU 9 (stage e').

When the ICU 9 receives the image processing content information from the digital copying machine 1, it prepares for the image processing operation and outputs a standby state canceling signal to the word processor 2 through the interface substrate 28 (stages f and g).

Then, the word processor 2 transfers the produced image data as print data (stage h).

The print data is sequentially transferred to the ICU 9 through the interface substrate 28. After a predetermined image processing operation is performed for each page, the data is stored page by page on the hard disk 35 in the ICU 9 (stage j).

The word processor 2 transfers the final image data and termination data for terminating the transfer of the print data (stage hn).

The termination data is transferred to the ICU 9 through the interface substrate 28 (stage jn).

When the image processing is complete, the ICU 9 outputs a feeding start signal to the PCU 27 (stage k). Then, the PCU 27 outputs a signal for performing preliminary feeding of sheet from a sheet tray selected beforehand in the digital copying machine 1 (stage l).

When the sheet fed by preliminary feeding reaches a predetermined position of the digital copying machine 1, a signal indicating the registration of the sheet is transferred to the ICU 9 from the PCU 27 which controls the operations of the digital copying machine 1 (stage m).

The ICU 9 sequentially transfers image information on which the image processing operation has been performed to the laser unit 10. Then, the laser unit 10 sequentially emits laser light to the photoreceptor 11 of the digital copying machine 1 according to the image information transferred from the ICU 9 (stage n).

At this time, if the operator has set a desired number of copies to be produced through the ten-key section 72, the set number of sheets are successively transported in sequence from the sheet tray. In addition, the processed image information is repeatedly read out from the hard disk 35 under the control by the ICU 9. The sheets on which images have been formed are sequentially output to the finisher 24 (stage o).

On the other hand, when the image processing is complete at stage "k", the ICU 9 outputs an image end signal to the interface substrate 28 so as to allow the reception of image information different from a sequence of the previously transferred image information (stage p).

Then, the interface substrate 28 opens the communication line to the word processor 2 according to the image end signal (stage q).

As described above, when the sequence of recording and reproduction of image information is complete, the normal mode as the print mode of the "Word processor" key (4-4) is temporarily cleared. As a result, the digital copying machine 1 enters into a standby state in the copying mode.

Like the returning to the copying mode from the extension mode, returning to the standby state in the copying mode is designed to be carried out immediately after the completion of a sequence of recording and reproducing operations.

As described above, the PCU 27 returns the state to the image input standby state (copying mode) standing by for receiving an image from the CCD optical unit 6 by cancelling the set processing mode immediately after the completion of the formation of image. Consequently, after the formation of image, the state ready for receiving image information from the word processor 2 is not maintained, thereby preventing other operators from performing mistaken operations.

Thus, since the operation for cancelling a mode is avoided, the digital copying machine 1 is operated in an improved manner.

Moreover, in the above-mentioned controlling procedure for the normal mode, the digital copying machine 1 is kept in state for receiving information, prepared according to the printing request and the image forming conditions from the word processor 2, kept on standby after selecting a sheet tray, and allowed to automatically transfer the image data. However, this is not a restricted procedure. For example, after the digital copying machine 1 temporarily stores a sequence of image information transferred from the word processor 2 on the hard disk 35, recording and reproduction of the image information may be sequentially performed in the image forming section 4 by operating the "Print" switch 73.

In this embodiment, returning to the standby state in the copying mode is executed immediately after the completion of a sequence of recording and reproducing operations in the printer mode. However, this is not a restricted procedure. For example, it is possible to install a timer (not shown) in the PCU 27 and to arrange the transfer mode to be cleared after the elapse of a predetermined time when the transfer mode is selected.

Specifically, as illustrated in FIG. 18, the PCU 27 sets the timer for a predetermined time when the digital copying machine 1 stands by for receiving image information from the word processor 2 (step 1). Then, whether there is a printing request from the operation panel 26 or not is judged within the predetermined time (step 2). If yes, after resetting the timer, the operational step moves to step (b) shown in FIG. 16 or 17. On the other hand, if there is no printing request in step 2, whether the set time has elapsed or not is judged (step 3). If the set time has elapsed, the transfer mode is cleared. Whereas if the set time has not elapsed, the operational step moves to step 2.

The control shown by the flow chart of FIG. 18 is executed between the stage "a" and the stage "e" in the state chart of FIG. 16, or between the stage "a" and the stage "e'" in the state chart of FIG. 17. The stage at which the control is executed is indicated by a mark "*" in FIG. 16.

As described above, when the digital copying machine 1 stands by for receiving image information from the word processor 2, even if the operator leaves the digital copying machine 1 for a long time, it is possible to prevent other operators from operating in the printer mode by mistake by the cancellation of the transfer mode after the elapsing of a predetermined time from the completion of the formation of image. In addition, since the transfer mode is kept until the predetermined time elapses after the formation of image, the necessity of resetting the transfer mode is eliminated by inputting image information from the word processor 2 during this period.

Consequently, although the apparatus has many functions on the whole, it does not require complicated operations. In short, it can be handled in an improved manner.

As described above, the digital image forming apparatus having the above-mentioned structure records and reproduces image information from the word processor 2 after editing using editing functions peculiar to the digital copying machine 1, selected in the digital copying machine 1, upon a printing instruction from the word processor 2 as an external device. Namely, it is possible to edit the image information input by the information editing section 30 of the word processor 2 in various ways using various editing functions displayed on the operation panel 26 and editing functions of the word processor 2. As a result, the function of an external device, for example, a word processor is expanded.

Moreover, since the ICU 9 has the large-capacity hard disk 35 capable of storing at least two pages of image information, it is possible to store a large volume of image information input through the word processor 2 page by page at a time. Furthermore, since the image information is processed page by page using the editing functions of the digital copying machine 1, it is possible to sequentially process a large volume of image information stored on the hard disk 35. It is thus possible to perform a variety of image information processing.

In this embodiment, first, the digital copying machine 1 is brought into a standby state when the operator selects the copying function of the digital copying machine 1 as a main function and the transfer mode for reproducing image information from the word processor 2 as an external device. Then, the transfer of the image information from the word processor 2 is executed. However, this is not a restricted procedure. For example, if a desired processing function is selected through the operation panel 26 when the digital copying machine 1 is on standby and if the transfer of the image information from the word processor 2 is started before the selected processing function is cleared, the digital copying machine 1 may be automatically switched to the transfer mode upon the reception of image information, and the received image information may be recorded and reproduced after performing processing under the currently specified processing conditions.

The PCU 27 of the digital copying machine 1 of this embodiment has a simulation mode (selecting means and priority setting means) for simulating various settings, for example, setting of the copying mode. In the simulation mode, it is possible to detail the settings so that the operator can use the digital copying machine 1 more easily. For example, it is possible to determine whether the coping function of the digital copying machine 1 has priority or the a function of recording image information from the word processor 2 has priority.

When the simulation mode as the selecting means is selected, if the start of image formation is instructed through the keyboard 29 of the word processor 2, the ICU 9 becomes capable of selecting whether or not the image information input from the information editing section 30 is to be processed by the first condition group as editing functions of the digital copying machine 1. For example, when part or all of processing conditions selected through the digital copying machine 1 and processing conditions (sheet size, magnification, mirror image, etc.) selected through the word processor 2 overlap, the setting of the word processor 2 is carried out first, and then the setting of the digital copying machine 1 is performed. In this case, the setting of the digital copying machine 1 is all reflected. When the extension mode is set in the digital copying machine 1, processing is performed to meet the processing conditions (sorting, stapling, double-side copying, etc.) of the digital copying machine 1, and then printing is carried out. When the normal mode is selected in the digital copying machine 1, it is arranged that processing is not performed depending on the processing conditions of the digital copying machine 1.

With this arrangement, since the operator is capable of freely setting processing conditions for image information, the apparatus can be handled in an improved manner.

When the simulation mode as the priority setting means is selected, it is possible to select whether processing for image information input from the CCD optical unit 6 or image information input from the word processor 2 has priority for processing. More specifically, when the transfer mode for processing the image information from the word processor 2 is set in the digital copying machine 1, it is possible to select inputting and printing of image information from the word processor 2, or automatically switching the mode to the transfer mode and executing printing when the image information is input from the word processor 2 at the time the digital copying machine 1 is in a standby state in the copying mode.

With this arrangement, since the operator is capable of freely setting processing conditions for image information, the apparatus is handled in an improved manner.

Moreover, in the digital image forming apparatus of this embodiment, the digital copying machine 1 is explained as a main device. However, it is possible to use a laser printer instead of the digital copying machine 1. In this case, if the document scanning section 3, the word processor 2 and other devices for providing image information are connected to the laser printer, the laser printer functions as a device similar to the digital image forming apparatus.

Furthermore, if the word processor includes a function for setting an operation mode of the finisher 24 or setting a double-side copying mode of the double-side copying unit 19, it is possible to selectively use the functions of the finisher 24 or the functions of the double-side copying unit 19 by operating the word processor 2. In this case, the processing information given by the word processor 2 is sent to the PCU 27 through the ICU 9 and used for setting an operation mode or a double-side copying mode.

In this embodiment, although the word processor 2 is used as an external device, the external device is not particularly restricted to a word processor. For instance, it is possible to use a personal computer and an electronic type writer as other types of data editing devices for editing data such as numerical data and character data.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A digital image forming apparatus comprising:
   (a) a main body having:
      image forming means for forming an image corresponding to given image information on a recording material;
      first input means for selecting a first processing condition from a first condition group including a plurality of processing conditions and inputting the selected first processing condition and image information;
      image processing means including a memory section for storing image information, and sequentially performing image processing page by page according to a processing condition regarding image formation; and
      controlling means for controlling an operation of said image forming means for converting to an image the image information processed by said image processing means; and
   (b) an image information output section disposed in a body separate from said main body, said image information output section having:
      second input means for selecting a second processing condition from a second condition group including a plurality of processing conditions different from the first condition group and inputting the selected second processing condition and image information;
      wherein when a third processing condition for entering said image processing means in a standby state in which receiving image information from said second input means is available and the first processing condition regarding image formation are input through said first input means, said controlling means is set to an extension mode in which said image forming means performs image formation by combining the first and second processing conditions regarding image formation input from said first input means and said second input means.

2. The digital image forming apparatus according to claim 1, wherein said image processing means cancels a processing condition which has been set immediately after a completion of image formation by said image forming means with respect to all the image information input from said second input means.

3. The digital image forming apparatus according to claim 1, wherein said image processing means includes a priority setting means for selecting which information takes precedence for processing between the image information from said first input means and the image information from said second input means.

4. The digital image forming apparatus according to claim 3, wherein if image information is input from said second input means when a mode in which image information from said first input means is processed is selected, said priority setting means switches the mode so that the image information from said second input means is processed.

5. The digital image forming apparatus according to claim 1, wherein said first input means comprises a scanner including a photoelectric converting element for optically reading a document image information and converting it to electric signals.

6. The digital image forming apparatus according to claim 1, wherein said second input means is formed by a data editing device for editing numerical data, character data and document data.

7. The digital image forming apparatus according to claim 6, wherein said data editing device is a word processor.

8. The digital image forming apparatus according to claim 1, further comprising:
   post-processing means for performing a predetermined post-processing operation on the recording material on which an image has been formed by said image forming means; and
   post-processing controlling means for controlling said post-processing means so that said post-processing means successively post-processes the recording material for each set of documents depending at least on the processing condition input from said first input means or said second input means.

9. The digital image forming apparatus according to claim 1, further comprising:

reversing means for turning over the recording material carrying an image formed on one of sides thereof by said image forming means and supplying again the recording material to said image forming means; and reversing instructing means for instructing said reversing means whether to turn over the recording material depending at least on the processing condition input from said first input means or said second input means.

10. The digital image forming apparatus according to claim 1, wherein said image processing means includes:
a plurality of processing sections having processing functions different from each other; and
an image editing section for editing input image information by selectively operating said processing section depending on a specified processing condition, and outputting the image information to said memory section;
wherein said image editing section includes a loop circuit.

11. The digital image forming apparatus according to claim 1, wherein said image processing means cancels a processing condition which has been set unless an instruction is given from said start instructing means within a predetermined time in which the processing condition is kept.

12. The digital image forming apparatus according to claim 1, wherein, when image information is input from said second input means before a processing condition input by said first input means is cancelled, said image processing means performs image processing according to the processing condition.

13. The digital image forming apparatus according to claim 1, wherein said memory section has a memory capacity for storing at least two pages of image information.

14. The digital image forming apparatus according to claim 1, wherein said second input means includes start instructing means for instructing starting of an operation of said image forming means.

15. The digital image forming apparatus according to claim 14, wherein when starting of image formation is instructed by said start instructing means, said image processing means sequentially stores the image information from said second input means page by page in said memory section, and performs image processing on image information readout from said memory section by combining the processing conditions input from said first input means and said second input means.

16. The digital image forming apparatus according to claim 14, wherein said image processing means includes selecting means for selecting that whether or not said image processing means performs image processing on image information from said second input means depending on the processing condition input from said first input means when an instruction to start image formation is given by said start instructing means.

17. The digital image forming apparatus according to claim 16, wherein when a mode in which image processing is performed depending on the processing conditions from said first input means and said second input means is selected, said selecting means accepts the processing condition input from said first input means.

18. The digital image forming apparatus according to claim 17, wherein when the processing conditions overlap, said selecting means selects the processing condition input from said second input means.

19. The digital image forming apparatus according to claim 16, wherein when a mode in which image processing is performed depending on the processing condition input from said second input means is selected, said selecting means ignores the processing condition input from said first input means.

20. The digital image forming apparatus according to claim 1, wherein said first input means includes first information input means for instructing starting of an image forming operation, and first image input means for inputting image information upon an instruction from said first information input means.

21. The digital image forming apparatus according to claim 20, further comprising:

post-processing means for performing a predetermined post-processing operation on the recording material on which an image has been formed by said image forming means; and post-processing controlling means for controlling said post-processing means so that said post-processing means successively post-processes the recording material for each set of documents depending at least on the processing condition input from said first information input means or said second information input means.

22. The digital image forming apparatus according to claim 20, further comprising:

reversing means for turning over the recording material carrying an image formed on one of sides thereof by said image forming means and supplying again the recording material to said image forming means; and reversing instructing means for instructing said reversing means whether to turn over the recording material depending at least on the processing condition input from said first information input means or said second information input means.

23. The digital image forming apparatus according to claim 20, wherein said first image input means comprises a scanner including a photoelectric converting element for optically reading a document image information and converting it to electric signals.

24. The digital image forming apparatus according to claim 20, wherein when the instruction to start image formation is input by said first information input means, said image processing means sequentially stores the image information from said first image input means page by page in said memory section, and performs image processing on image information readout from said memory section page by page depending on the processing condition input from said first information input means.

25. The digital image forming apparatus according to claim 20, wherein said image processing means cancels a processing condition which has been set immediately after a completion of image formation by said image forming means with respect to all the image information from said second image input input means.

26. The digital image forming apparatus according to claim 20, wherein said second image input means is formed by a data editing device for editing numerical data, character data and document data.

27. The digital image forming apparatus according to claim 26, wherein said data editing device is a word processor.

28. The digital image forming apparatus according to claim 20, wherein said image processing means includes a priority setting means for selecting which image information takes precedence for processing between the image information from said first image input means and the image information from said second image input means.

29. The digital image forming apparatus according to claim 28, wherein if image information is input from said second image input means when a mode in which image information from said first image input means is processed is selected, said priority setting means switches the mode so that the image information from said second image input means is processed.

30. The digital image forming apparatus according to claim 20, wherein said image processing means includes selecting means for selecting that whether or not said image processing means performs image processing on image information from said second image input means depending on the processing condition input from said first information input means when an instruction to start image formation is input by said second information input means.

31. The digital image forming apparatus according to claim 30, wherein when a mode in which image processing is performed depending on the processing condition input from said second information input means is selected, said selecting means ignores the processing condition input from said first information input means.

32. The digital image forming apparatus according to claim 30, wherein when a mode in which image processing is performed depending on the processing conditions input from said first information input means and said second information input means is selected, said selecting means accepts the processing condition input from said first information input means.

33. The digital image forming apparatus according to claim 32, wherein when the processing conditions overlap, said selecting means selects the processing condition input from said second information input means.

34. The digital image forming apparatus according to claim 20, wherein, when image information is input from said second input means before a first processing condition input by said first input means is cancelled, said image processing means performs image processing according to the first processing condition.

* * * * *